Figure 1:
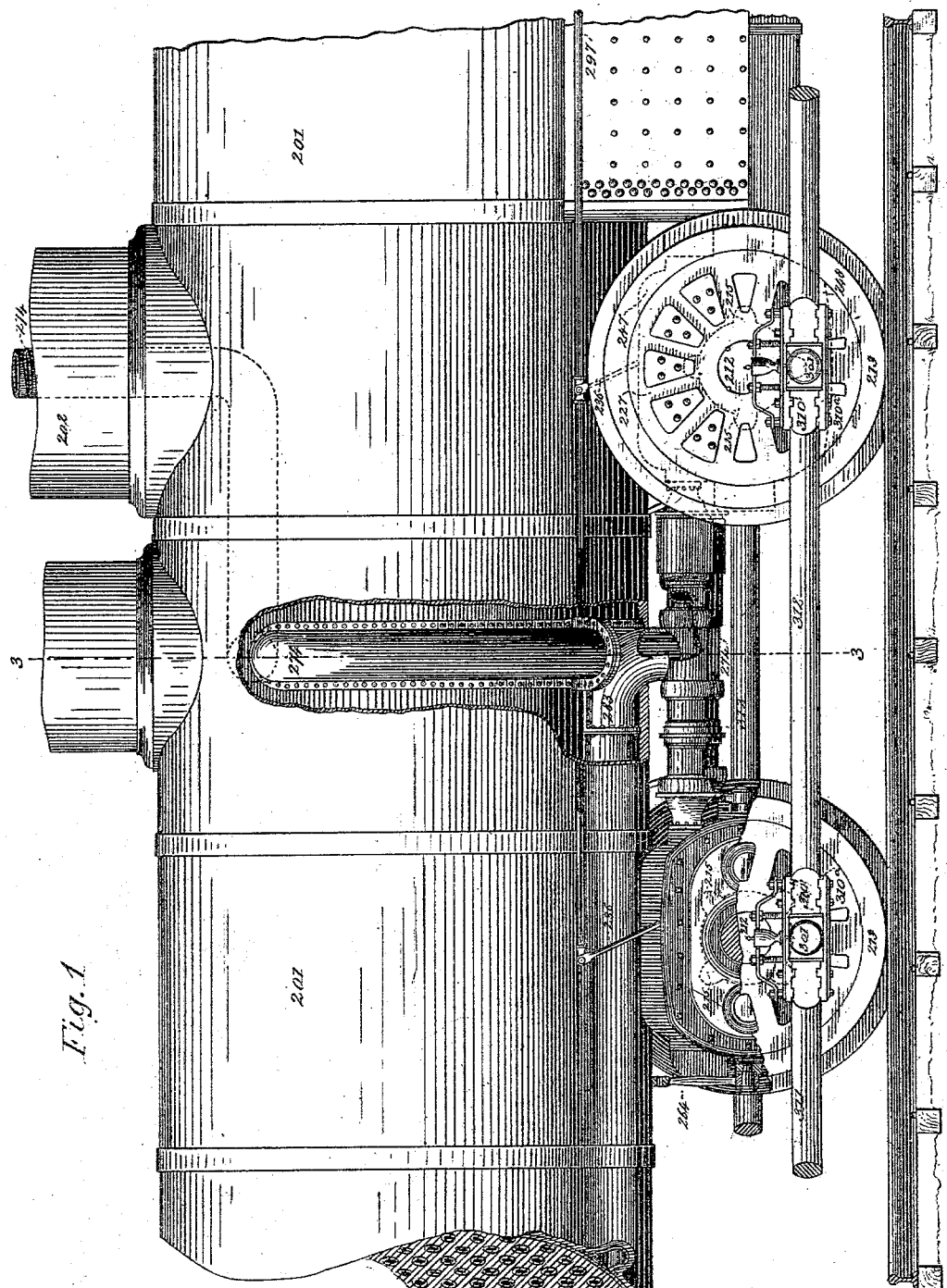

(No Model.) 22 Sheets—Sheet 1.

I. N. FORBES.
ROTARY ENGINE LOCOMOTIVE.

No. 274,480. Patented Mar. 27, 1883.

Witnesses:
Ernest Abshagen
Fred. L. Foster

Inventor:
Isaac N. Forbes,
By his Attorneys
Knight Bros (No Model.) 22 Sheets—Sheet 2.

I. N. FORBES.
ROTARY ENGINE LOCOMOTIVE.

No. 274,480. Patented Mar. 27, 1883.

Witnesses:
Ernest Abshagen
Fred. C. Foster

Inventor:
Isaac N. Forbes,
By his Attorneys
Knight (No Model.) 22 Sheets—Sheet 3.
I. N. FORBES.
ROTARY ENGINE LOCOMOTIVE.
No. 274,480. Patented Mar. 27, 1883.
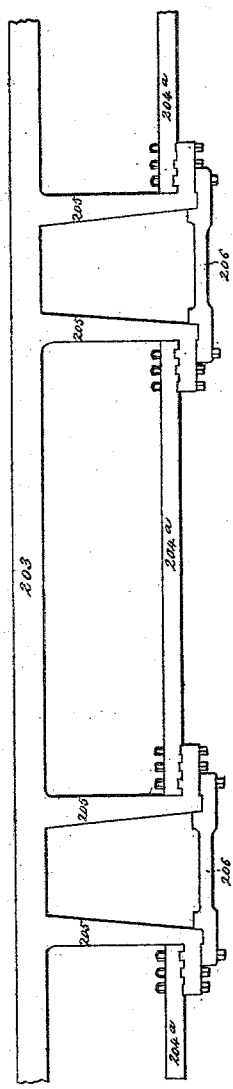
Fig. 2.b
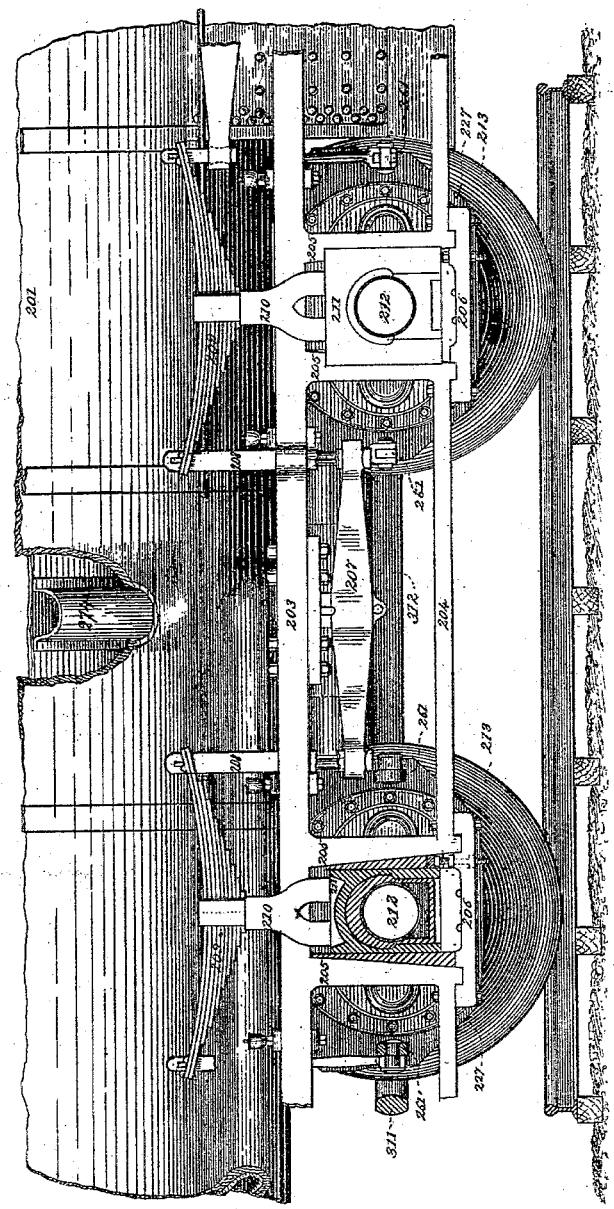
Fig. 2.a
Witnesses.
E. Abshagen
Fred. L. Foster
Inventor:
Isaac N. Forbes.
By his Attys Knight Bros (No Model.)

I. N. FORBES.
ROTARY ENGINE LOCOMOTIVE.

No. 274,480. Patented Mar. 27, 1883.

22 Sheets—Sheet 4.

Witnesses:
Ernest Abshagen
Fred. L. Foster

Inventor,
Isaac N. Forbes,
By his Attorneys Knight Bros (No Model.)  22 Sheets—Sheet 7.

I. N. FORBES.
ROTARY ENGINE LOCOMOTIVE.

No. 274,480.  Patented Mar. 27, 1883.

WITNESSES
Ernest Abshagen
Fred. L. Foster

INVENTOR
Isaac N. Forbes,
By his Attorneys
Knight Bro (No Model.)  22 Sheets—Sheet 8.

I. N. FORBES.
ROTARY ENGINE LOCOMOTIVE.

No. 274,480. Patented Mar. 27, 1883.

Witnesses.
E. Abshagen
Fred L. Foster

Inventor
Isaac N. Forbes.
By his attys Knight Bros (No Model.)

22 Sheets—Sheet 9.

I. N. FORBES.
ROTARY ENGINE LOCOMOTIVE.

No. 274,480. Patented Mar. 27, 1883.

Witnesses:
Ernest Abshagen
Fred. L. Foster

Inventor:
Isaac N. Forbes,
By his Attorneys Knight Bros.

N. PETERS, Photo-Lithographer, Washington, D. C.

(No Model.)  22 Sheets—Sheet 11.

I. N. FORBES.
ROTARY ENGINE LOCOMOTIVE.

No. 274,480.  Patented Mar. 27, 1883.

Witnesses.  Inventor.
E. Abshagen  Isaac N. Forbes
Fred L. Foster  By his attys Knight Bros.

N. PETERS. Photo-Lithographer, Washington, D. C.

(No Model.)  
22 Sheets—Sheet 12.

I. N. FORBES.
ROTARY ENGINE LOCOMOTIVE.

No. 274,480. Patented Mar. 27, 1883.

Witnesses:  
E. Abshagen  
Fred L. Foster

Inventor:  
Isaac N. Forbes,  
By his Attorneys  
Knight Bros (No Model.) 22 Sheets—Sheet 14.
I. N. FORBES.
ROTARY ENGINE LOCOMOTIVE.
No. 274,480. Patented Mar. 27, 1883.

Witnesses.
Ernest Abshagen
Fred L. Foster

By his Attorneys
Knight Bros.

Inventor:
Isaac N. Forbes, (No Model.)  22 Sheets—Sheet 15.
I. N. FORBES.
ROTARY ENGINE LOCOMOTIVE.
No. 274,480.  Patented Mar. 27, 1883.
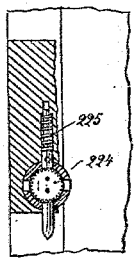
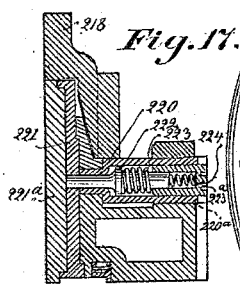
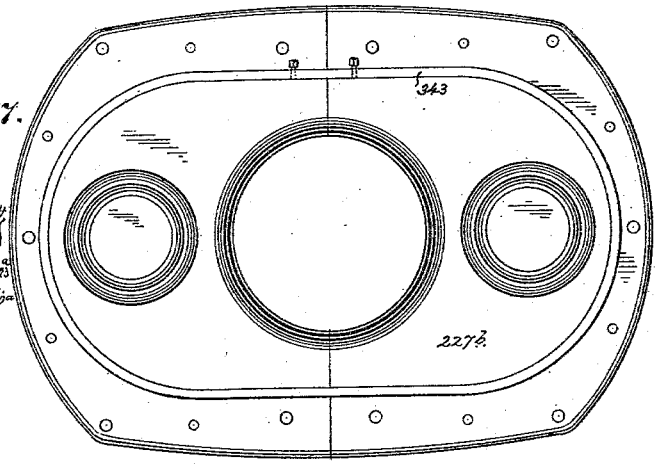
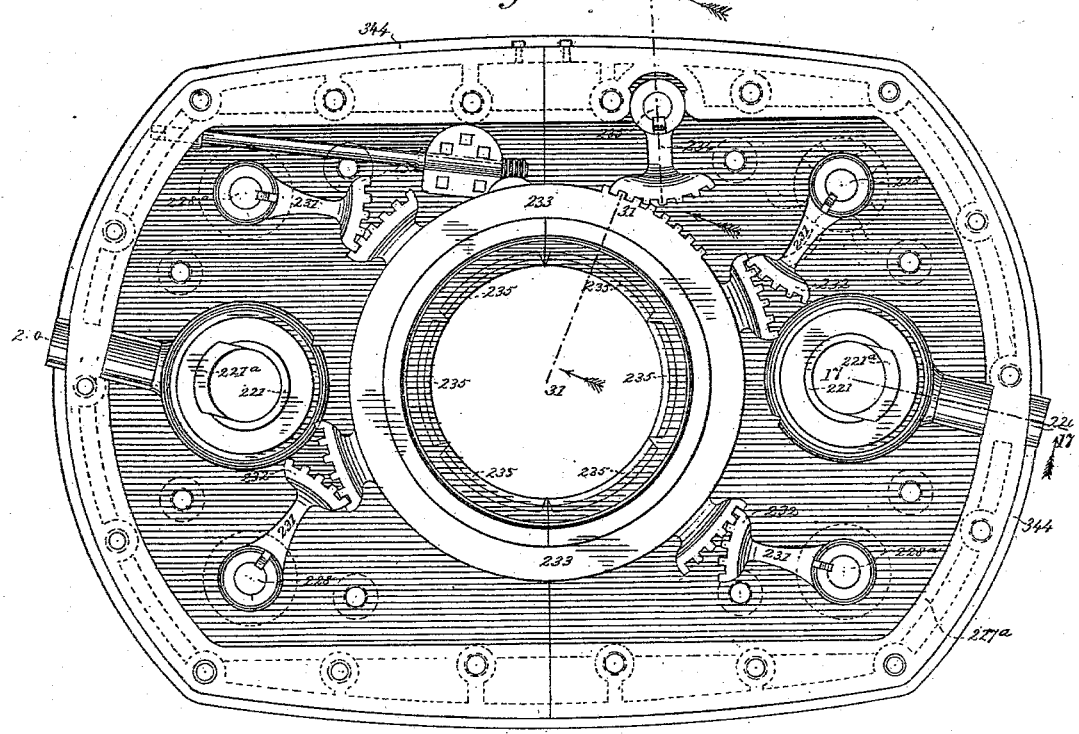
Witnesses.  
E. Abshagen  
Fred. L. Foster
Inventor.  
Isaac N. Forbes.  
By his attys Knight Bros (No Model.) 22 Sheets—Sheet 16.
I. N. FORBES.
ROTARY ENGINE LOCOMOTIVE.
No. 274,480. Patented Mar. 27, 1883.
*Fig. 19*
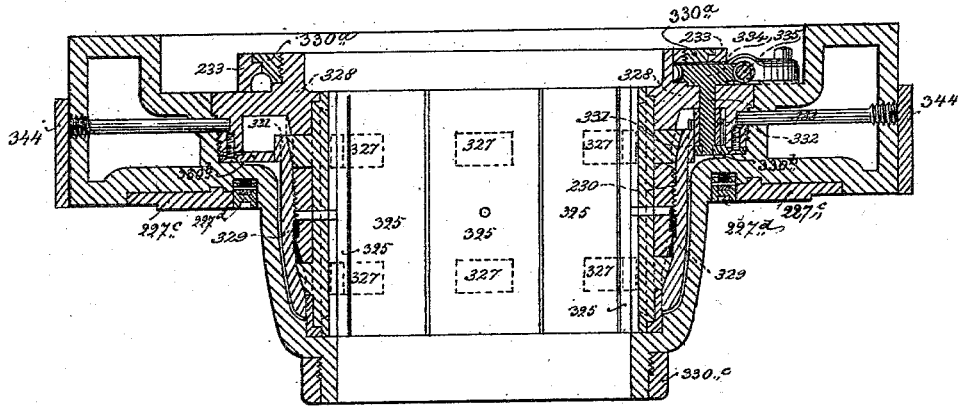
*Fig. 20.*
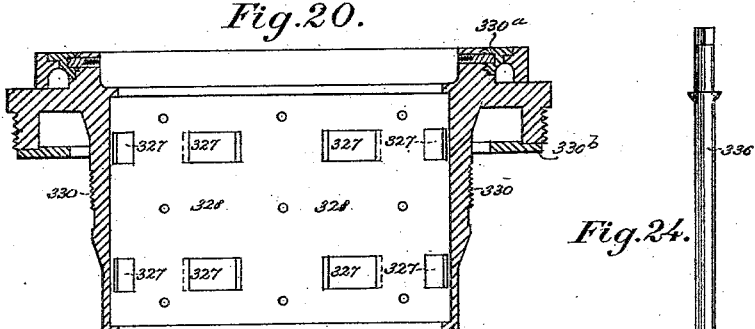
*Fig. 24.*
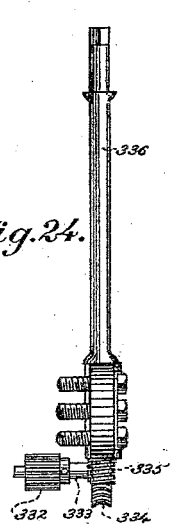
*Fig. 21.*
*Fig. 22.  Fig. 23.*
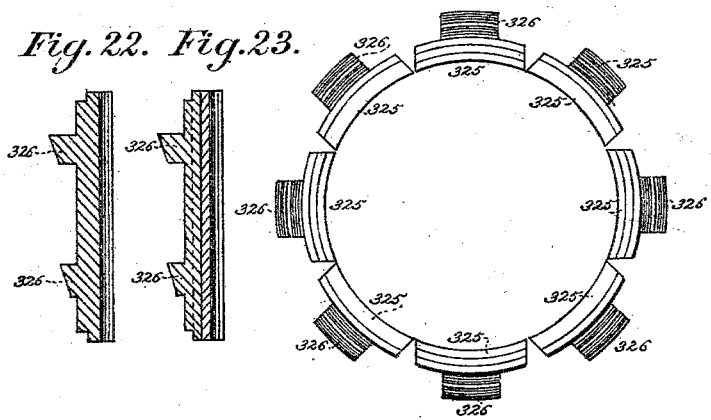
WITNESSES
E. Abshagen
Fred L. Foster
INVENTOR
Isaac N. Forbes,
By Knight Bros
his Attorneys

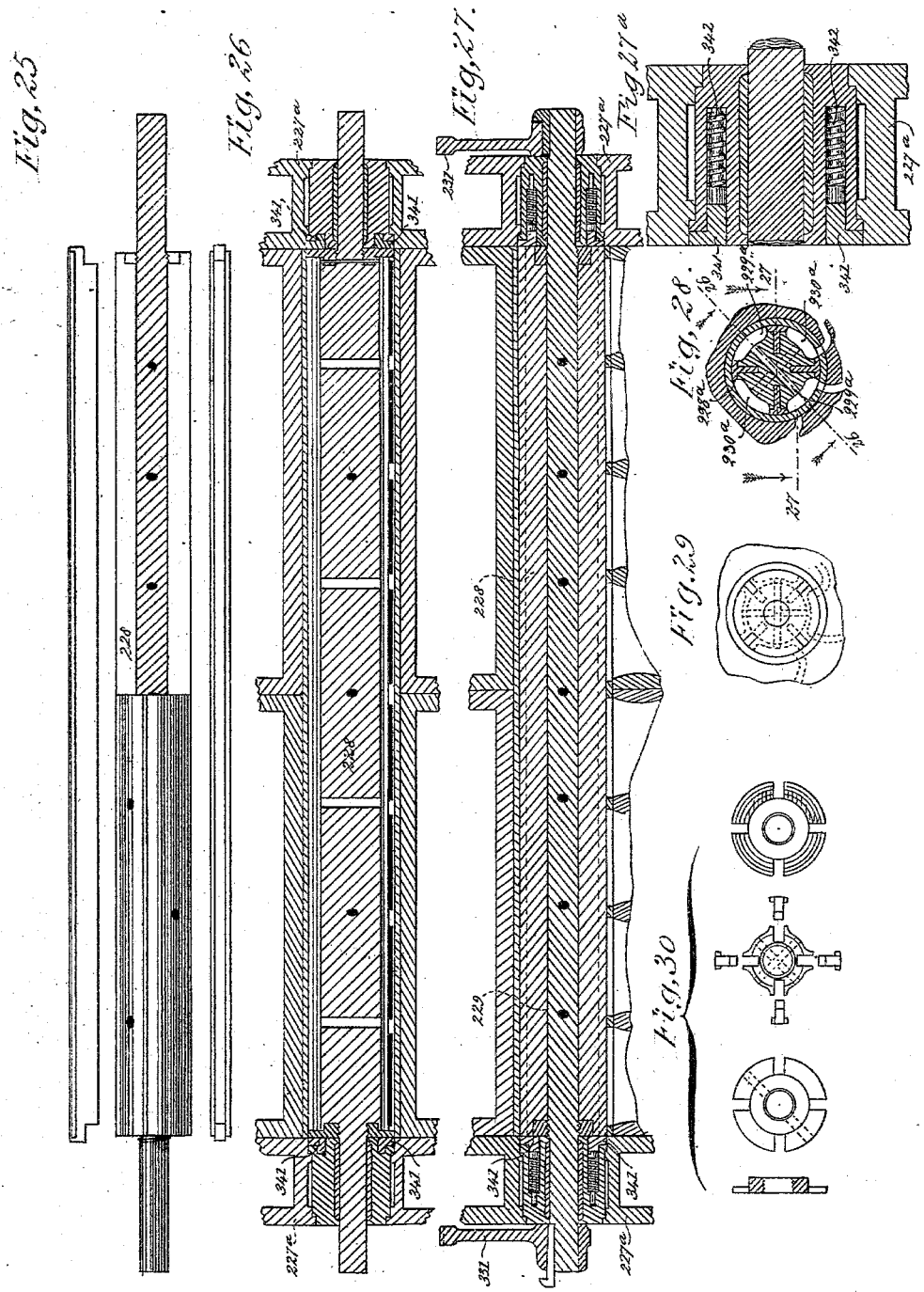

(No Model.) 22 Sheets—Sheet 18.
I. N. FORBES.
ROTARY ENGINE LOCOMOTIVE.
No. 274,480. Patented Mar. 27, 1883.
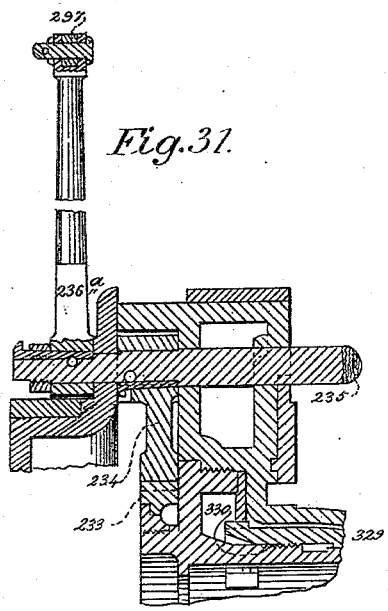
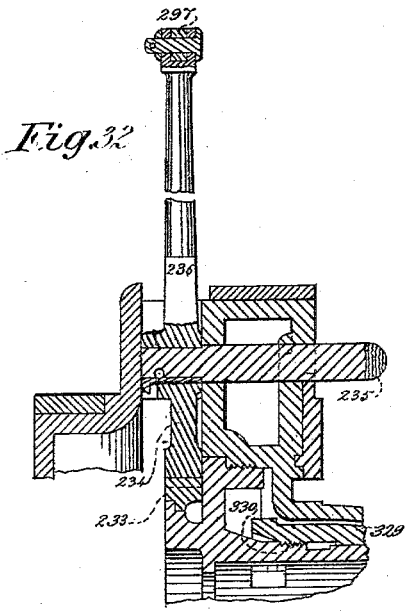
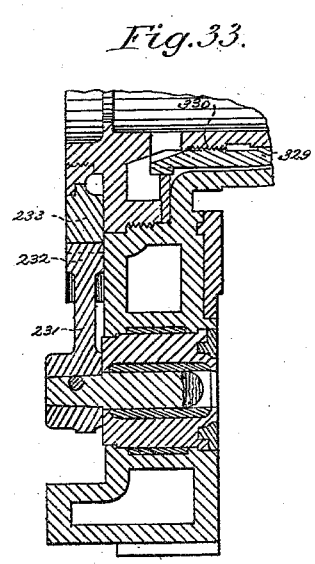
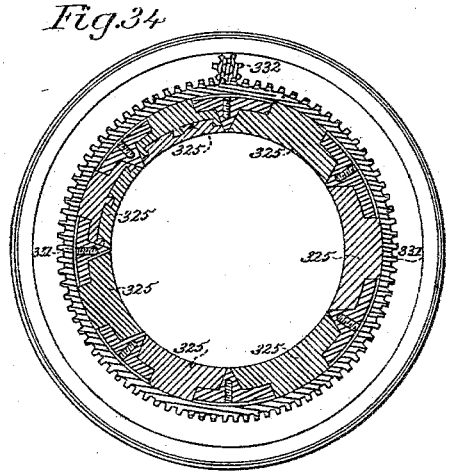
WITNESSES
INVENTOR
Isaac N. Forbes (No Model.)  
22 Sheets—Sheet 19.

I. N. FORBES.
ROTARY ENGINE LOCOMOTIVE.

No. 274,480. Patented Mar. 27, 1883.

Witnesses.
E. Abshagen
Fredk. L. Foster

Inventor:
Isaac N. Forbes.
By his attys. Knight Bros.

(No Model.) 22 Sheets—Sheet 20.

I. N. FORBES.
ROTARY ENGINE LOCOMOTIVE.

No. 274,480. Patented Mar. 27, 1883.

Witnesses:
E. Abshagen
Fred. L. Foster

Inventor;
Isaac N. Forbes,
By his Attorneys
Knight Bros

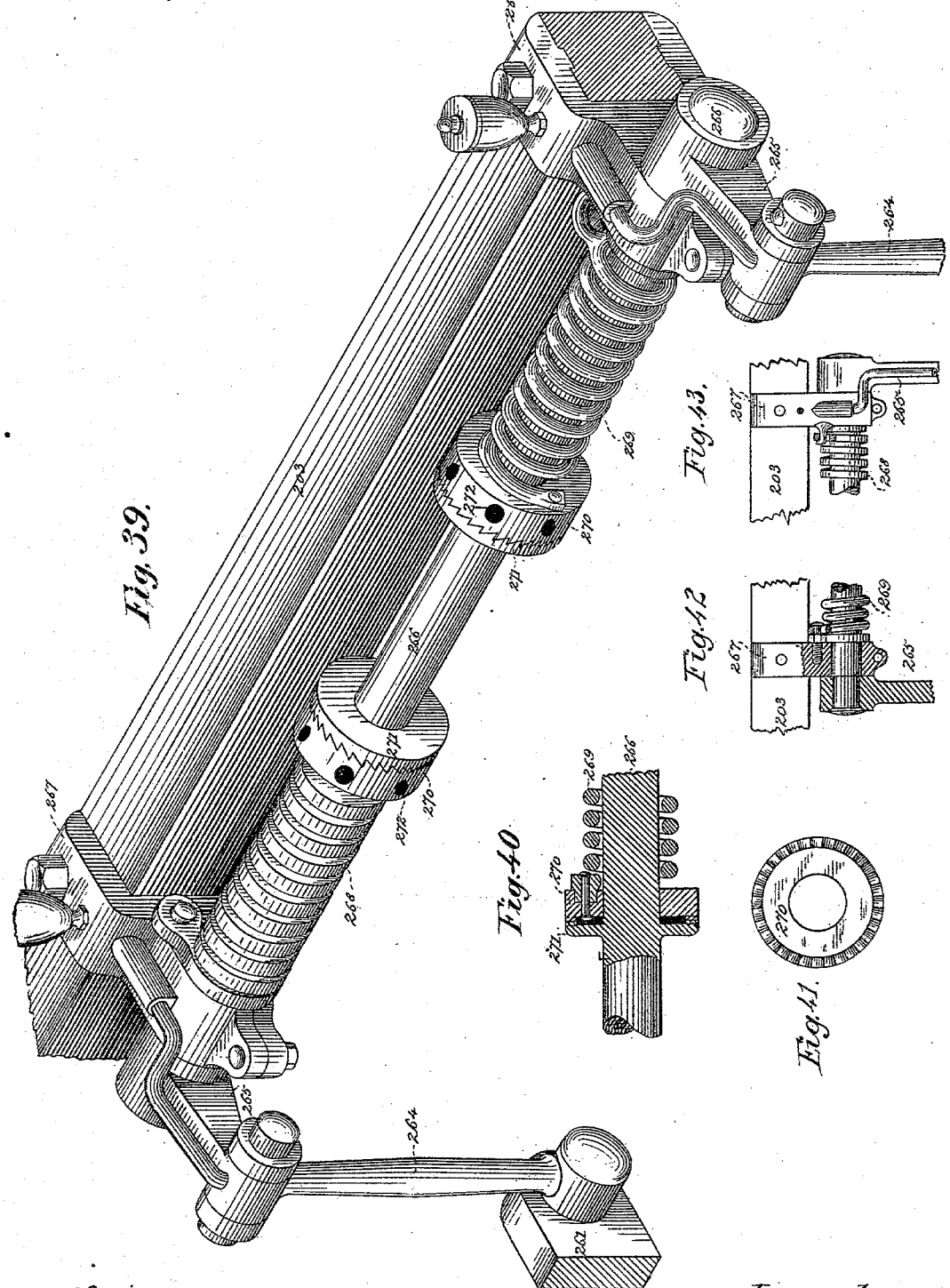

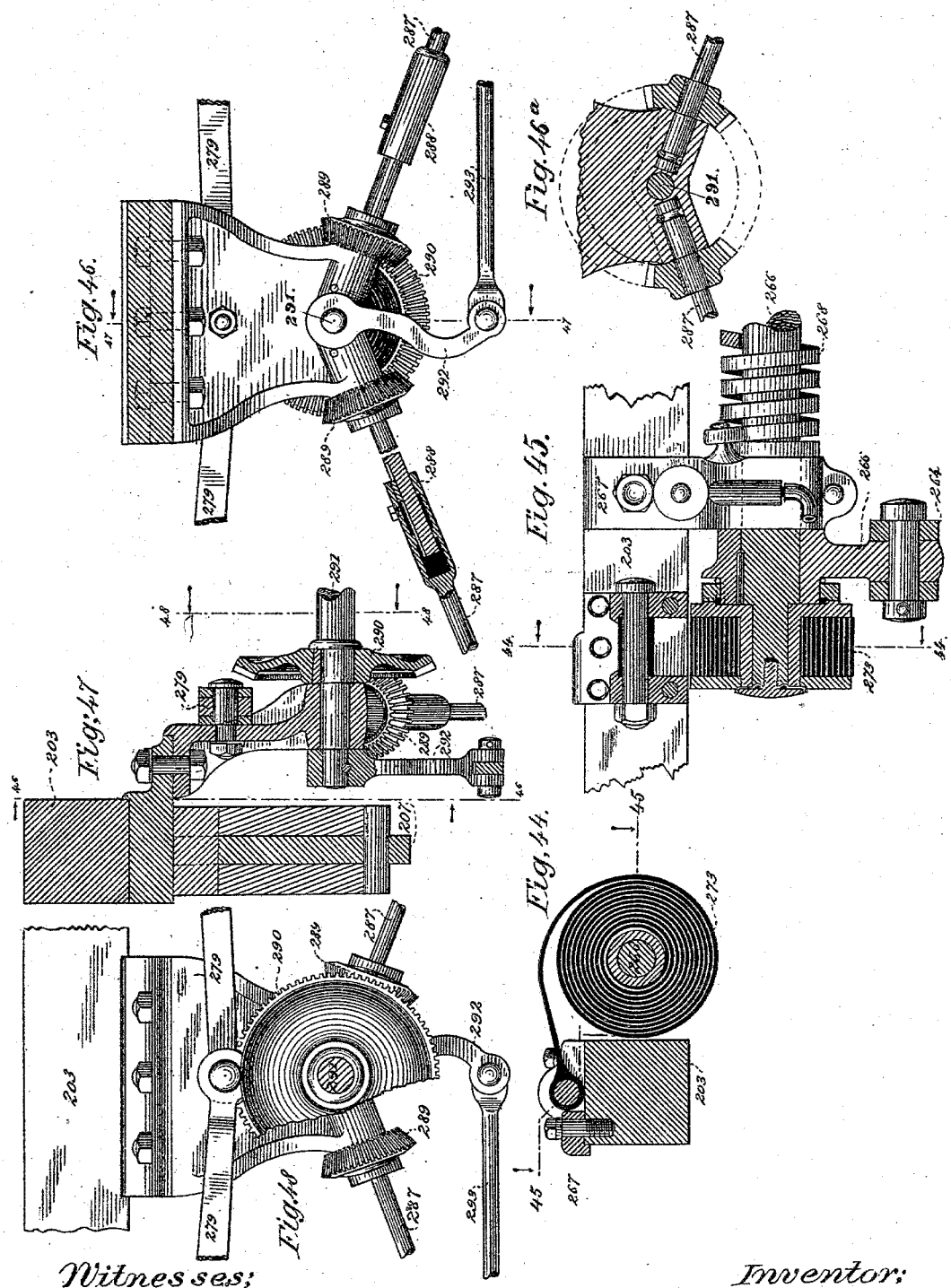

UNITED STATES PATENT OFFICE.

ISAAC NEWTON FORBES, OF LAWRENCE COUNTY, DAKOTA TERRITORY.

ROTARY-ENGINE LOCOMOTIVE.

SPECIFICATION forming part of Letters Patent No. 274,480, dated March 27, 1883.

Application filed July 26, 1882. (No model.)

*To all whom it may concern:*

Be it known that I, ISAAC NEWTON FORBES, of Lawrence county, in the Territory of Dakota, temporarily residing at Washington, in the District of Columbia, have invented certain new and useful Improvements in Rotary-Engine Locomotives, of which the following is a specification.

The leading object of my invention is to produce a new and improved locomotive capable of running at higher speed with less danger of accident and with less wear and tear to the track and the running-gear and at less expense than locomotives now in use. To this end I have devised a trochilic or rotary engine of new and improved construction, having recessed abutment-rollers geared to rotate in unison with the piston-wheel. One or more of these improved rotary engines I mount directly on an axle or axles of the locomotive, so as to apply the power directly thereto, thereby avoiding the loss of power and other injurious effects which result from change of momentum and the indirect application of force in the use of reciprocating engines. I am also enabled, while increasing the speed of the engine, to reduce the size of the driving-wheels, thereby bringing the center of gravity much nearer to the track, and consequently reducing the lateral rocking or swaying movement to which locomotives of ordinary construction are subject, especially at high speed, reducing strains in passing around curves, and eliminating a great cause of accident. The engine cylinder is suspended from the locomotive-frame by elastic supports, relieving the axle of the weight thereof and the bearings from vertical pressure. The steam and exhaust pipes are fitted with flexible or jointed couplings to permit relative vertical movement between the boiler and the engine. My trochilic engine is divided longitudinally for convenience of application to and removal from the driving shaft or axle while the wheels are fixed thereon. The cylinder is also transversely divided into two or more parts for convenience of manufacture. The cylinder-heads are likewise divided, and their parts are held together by threaded rings, embracing semi-annular flanges prepared to receive them, and by a main band around the outside thereof. The rotary piston-wheel is constructed with two or more rigid teeth and with abutment-rollers of half the diameter of the piston-wheel geared thereto, so as to rotate in unison without slip, and recessed to permit the passage of the piston-teeth. Fourfold oscillating valves perforated for the passage of steam for the purpose of balancing the pressure on their opposite sides are employed for starting, stopping, and reversing the engine, said valves being actuated, through the medium of rigid arms on their shafts, by a ring concentric with the cylinder, carrying cogged segments gearing with the segment-arms of the valves and operated by a segment-lever under control of the engineer. The abutment-rollers are mounted in adjustable bearings, and are pressed in contact with the piston-wheel by springs supported by hollow set-screws. The trochilic engine occupies almost the entire length of the axle between the journal-bearings of the locomotive, and in order to afford additional room and area for steam-pressure on the teeth or pistons, and to economize space, the piston-wheels are concaved at each end and the heads are made convex to fit, thus affording room for the end of the piston-wheel and teeth to extend over the inner portion of the main-shaft engine-bearings, which are located in the heads, thus affording additional length, and hence area of piston and capacity of engine, without increasing the diameter or length thereof.

To afford additional length of engine and sufficient space for locomotive-bearings, if required, where the driving-wheels are not of sufficient width apart, then their inner surfaces are concaved and outer surfaces convexed, which afford the additional length of bearings. To afford sufficient length and area of abutment-roller bearings consistent with room, as stated, between the wheels, the gear-wheels upon the abutment-roller journals which gear with the main-shaft gear-wheel for driving the abutment-rollers in harmony with the piston-wheel are made concave or cup-shaped to correspond with the main gear, which are set in next the heads, so as not to interfere with the main locomotive-bearings. The receive and exhaust openings are located in the upper portion, at one side of the engine-cylinder casing, leaving the top, bottom, and ends free. To balance the internal pressure on the opposite sides of the cylinder-casing and prevent the tipping effect which would be produced on the casing by unequal pressure, pistons are introduced opposite the steam supply and exhaust openings, and of equal area thereto, the pressure on these pistons being sustained by a bar connected by rods at each end to the locomotive-frame. The top of the engine is formed with a recess or concavity concentric with the bottom of the boiler, thus economizing vertical space and bringing the boiler nearer to the track. The bottom of the engine is provided with a protecting-casing containing elastic substance, if desired, which may be a non-conductor of heat. Within this is a chamber containing asbestos, plaster-of-paris, or other suitable non-conducting material. Suitable lagging of non-conductor of heat is also provided on top of the engine, and in some cases in other parts also. The bearings of the engine-shaft in the cylinder-heads are formed of segments having inclined or wedge-shaped projections upon their backs, which projections extend through mortises in their casing or housing. These segments are adjusted radially inward by an internally-threaded cylinder or ring rotated by means of a pinion and working on screw-threads formed on the supporting frame-work of the bearing-segments, so as by imparting longitudinal movement to the cylinder or ring to force the bearing-pieces inward, as required. The pinion is operated by a screw-gear permitting the adjustment of the bearings from the outside. The chambers or cavities within the cylinder-heads are filled with oil or other lubricant, either with or without cotton-waste or other capillary material. The oil or lubricant is prevented from escaping at the joints by external covers to the heads and by collars on the axle, having cavities on their inner faces to accommodate the heads of the keys by which the connecting-gears are fixed to the axle, and carrying spring packing-rings on their outer faces, forming oil-tight joints against the covers of the heads. The steam-supply pipes extend from within the dome to the outside of the boiler and around each side thereof, uniting at the bottom, and thence running longitudinally to the inlet-ports of the engines. Exhaust-pipes are located on each side of the steam-pipe and along the sides of the boiler and connect with blast-nozzles in the stack, or discharge the steam in any preferred way. Cocks for discharging water of condensation from the cylinders are operated simultaneously from the cab of the engine by means of suitable levers, rods, shafts, and gearing.

In order to afford room for the steam-supply pipes around the boiler, the equalizing-bar between the two drivers to which rotary engines are applied are located underneath the top or main bar of the frame, on each side, and are connected by hangers with springs, which connect the spring in the usual way. The hangers may pass through mortises in the frame, or upon the inner side thereof, or both sides, if desired, and connect with the equalizing-bar below. The mode of suspending the cylinders of the rotary engines from the frame is by crank-arms or torsion-shafts held by spiral or other springs or other elastic force connected with said shafts by ratchet-wheels or otherwise, by means of which the strength of the springs or force may be accurately adjusted to the weight of the engine. The driving-wheels on the same side of the locomotive are connected by coupling-rods mounted on hollow wrist-pins containing oil, which is received from an oil-cup on top, enters the axial cavity in the pin through a radial opening, and is supplied to the surface through a circumferential groove. The wrist-pins are arranged ninety degrees apart on the respective wheels on the same axle. The coupling-rods are elliptic in cross-section, or of any shape desired, and are connected together by flanged clamp-plates and through-bolts, confining between their ends the two parts of the wrist-pin box, which are adjusted to the journal of the pin by keys set up and secured by screws and nuts in customary manner, excepting that they are upside down. By using on two coupled axles single rotary-engines, having the piston-teeth of one engine at an angle of forty-five degrees from those of the other, as in the present case, and at ninety degrees if but two teeth for each piston-wheel, with cut-off valves applied, so that the piston-teeth of one engine will be between the ports and under full head of steam while those of the other engine are passing the inlet-ports, the effect of a double engine is produced and dead-centers entirely avoided, the same as though each were double engine.

Parts of my invention which are applicable in common to locomotive and stationary trochilic or rotary engines are made the subjects of other applications.

Figure 2:
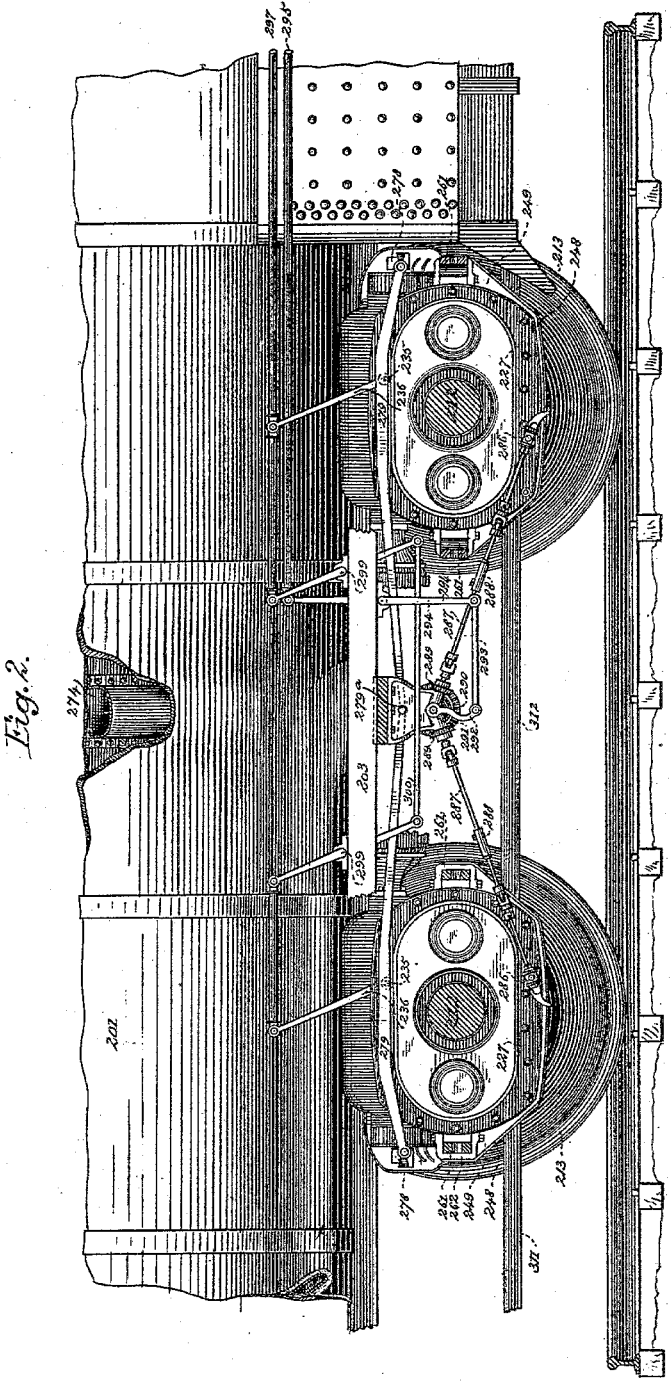
Figure 3:
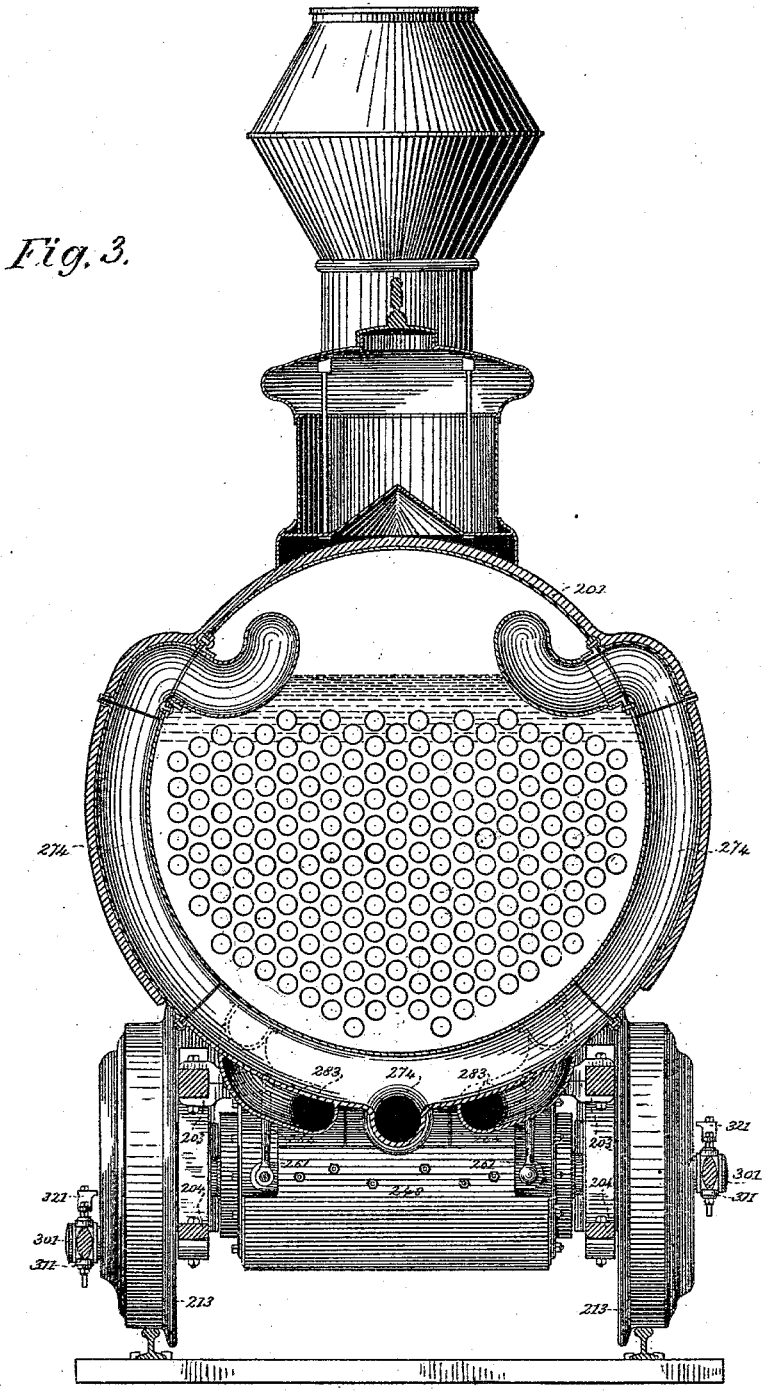
Figure 4:
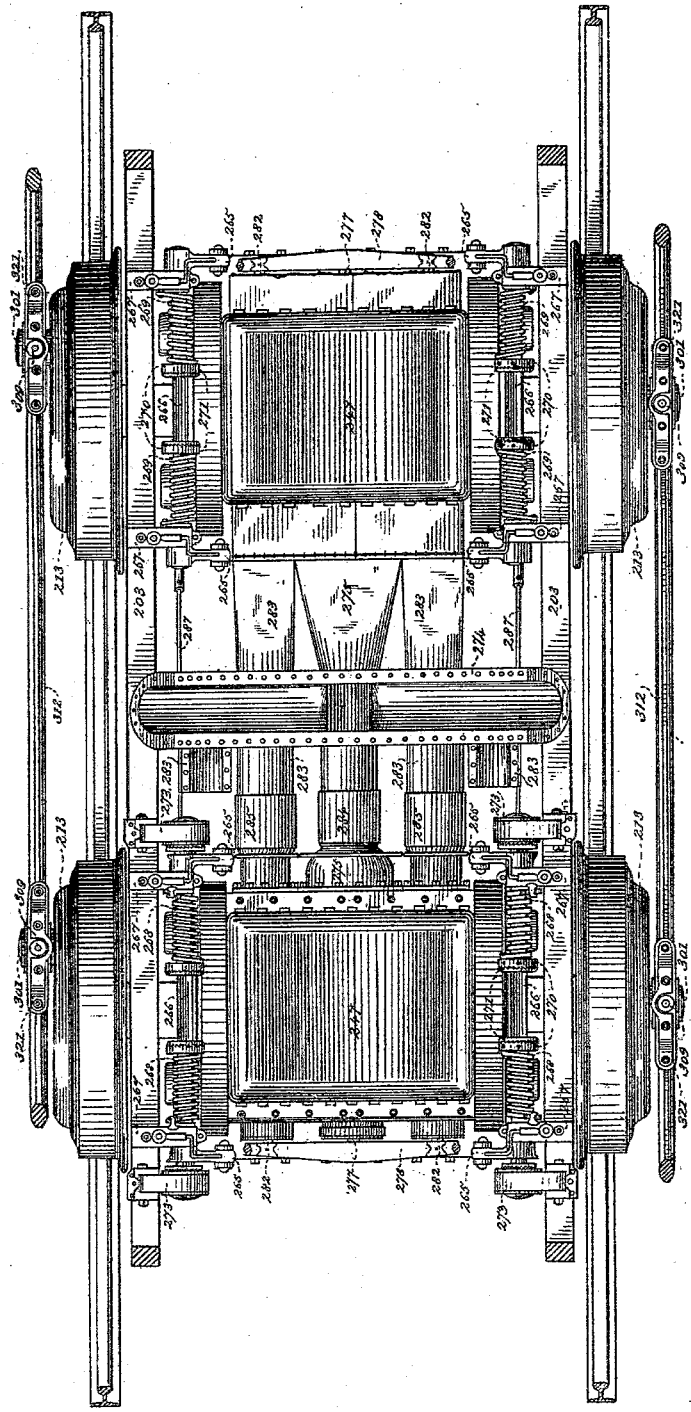
Figure 5:
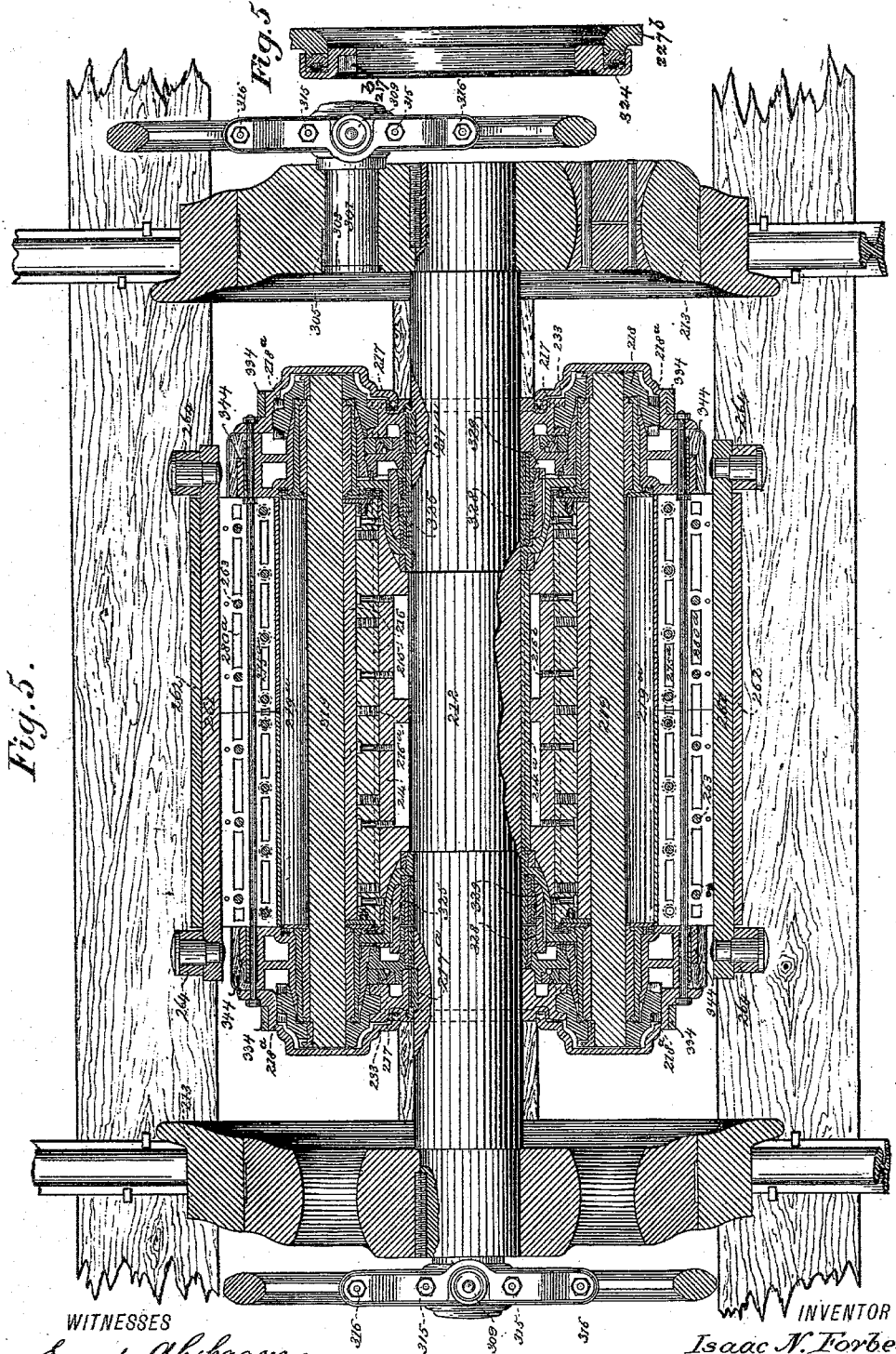
Figure 6:
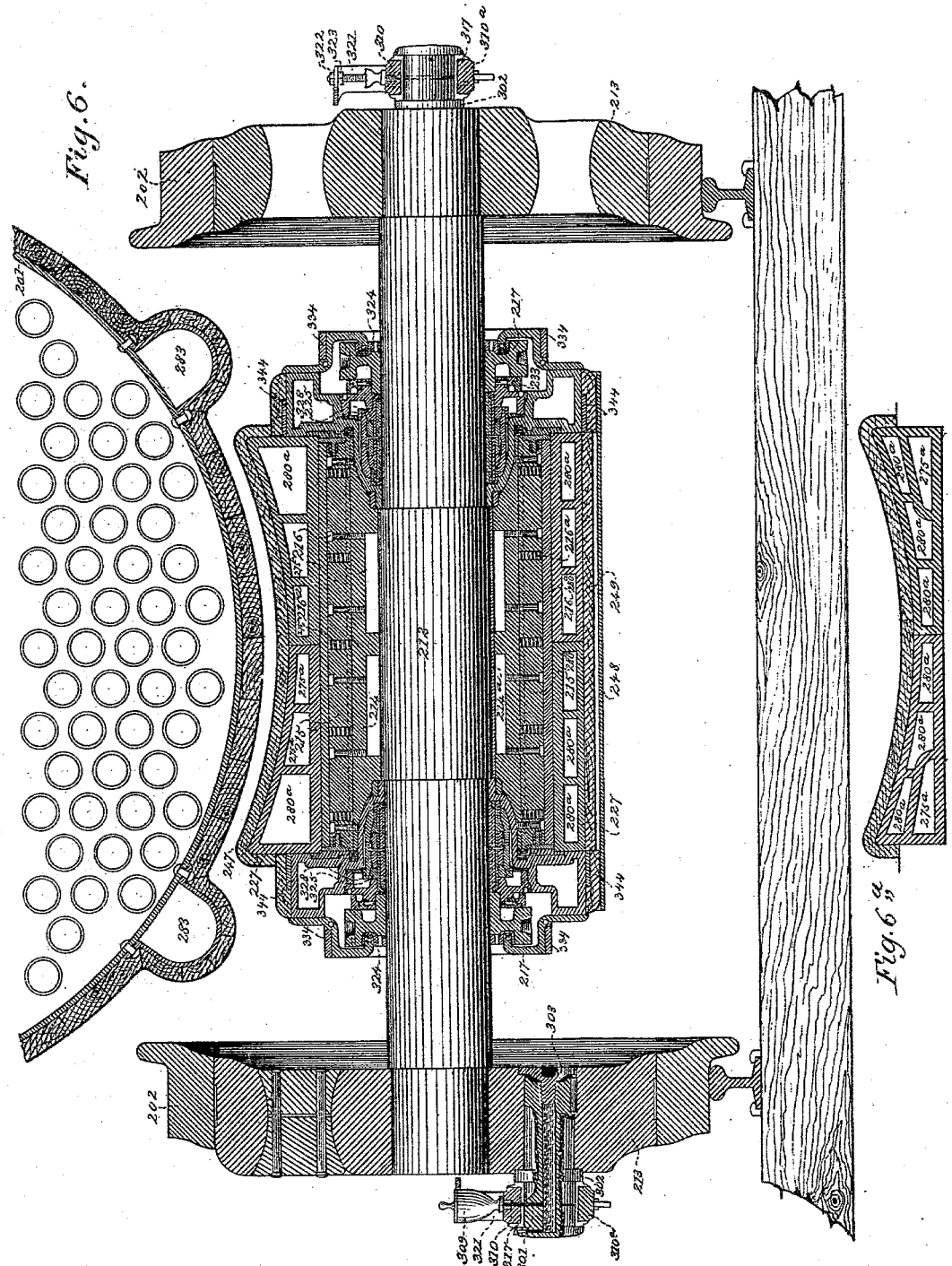

In the accompanying drawings, Figure 1 is a side view of a portion of a locomotive illustrating the invention. Fig. 2 is a side elevation, partly in section, of the driving-gear of the same, with the near wheels and most of the frame removed. Fig. 2$^a$ is a similar view with the frame in position and one axle-box in section. Fig. 2$^b$ is an elevation of the frame, illustrating a modification in its construction. Fig. 3 is a vertical section of the said locomotive on the line 3 3, Fig. 1. Fig. 4 is a plan view of the running-gear and boiler connections. Fig. 5 is a horizontal section of a rotary or trochilic engine applied to the axle of a locomotive, showing portions of the connecting-rods. Fig. 5$^a$ is an enlarged view of a portion of the outer cover and packing-ring in which it fits and collar or ring which is fitted tight to the main shaft against the hub of the gear-wheel, in which ring the packing-ring is fitted and secured firmly. Fig. 6 is a vertical section of Fig. 5, including a portion of the boiler, the plane of section being longitudinal to the engine proper and transverse to the locomotive. Fig. 6$^a$ is a section in the same plane of the upper portion of the engine-cylinder, illustrating a modification in the steam-passages with the non-conductor covering in place.

Figure 7:
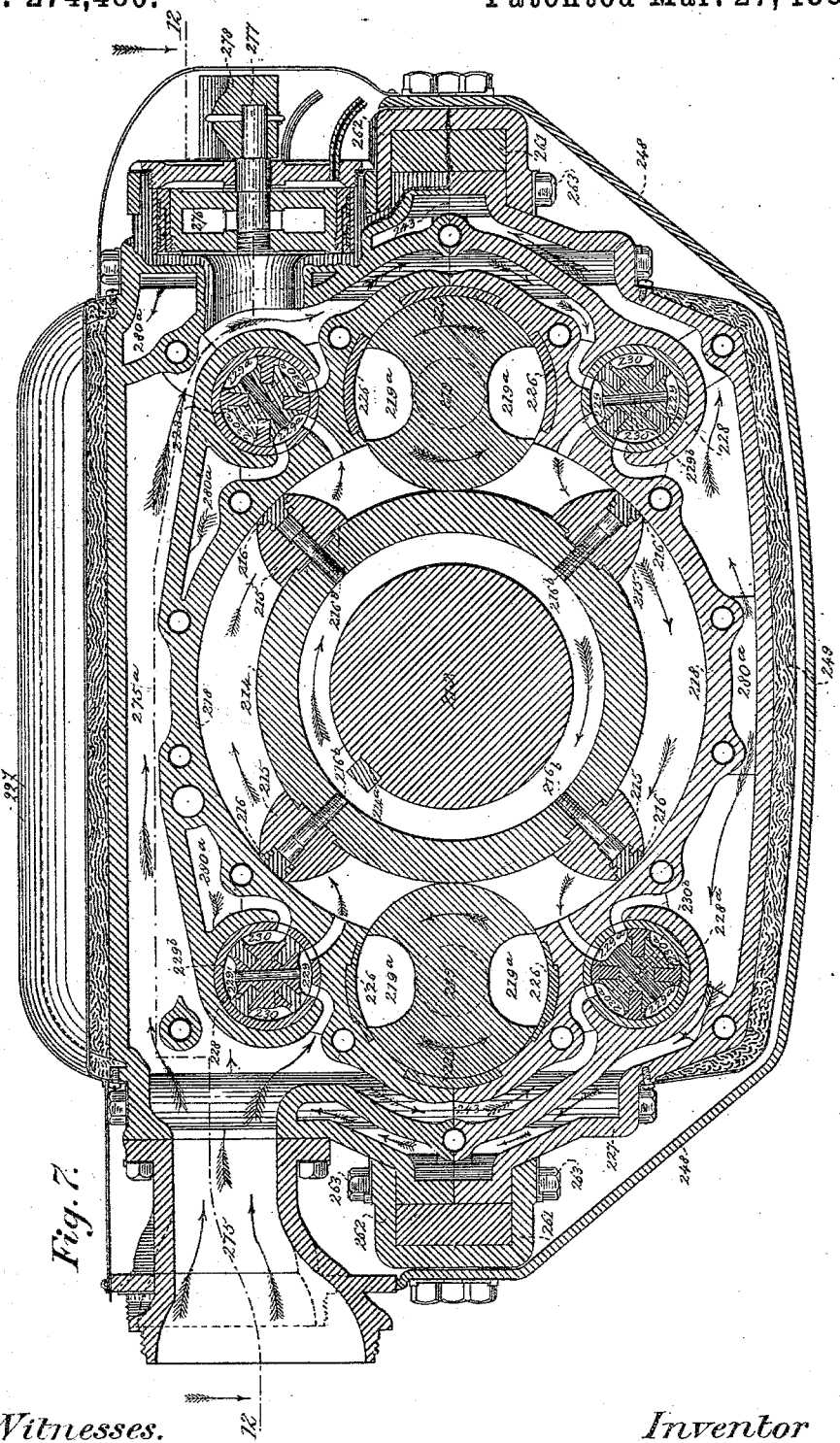
Figure 8:
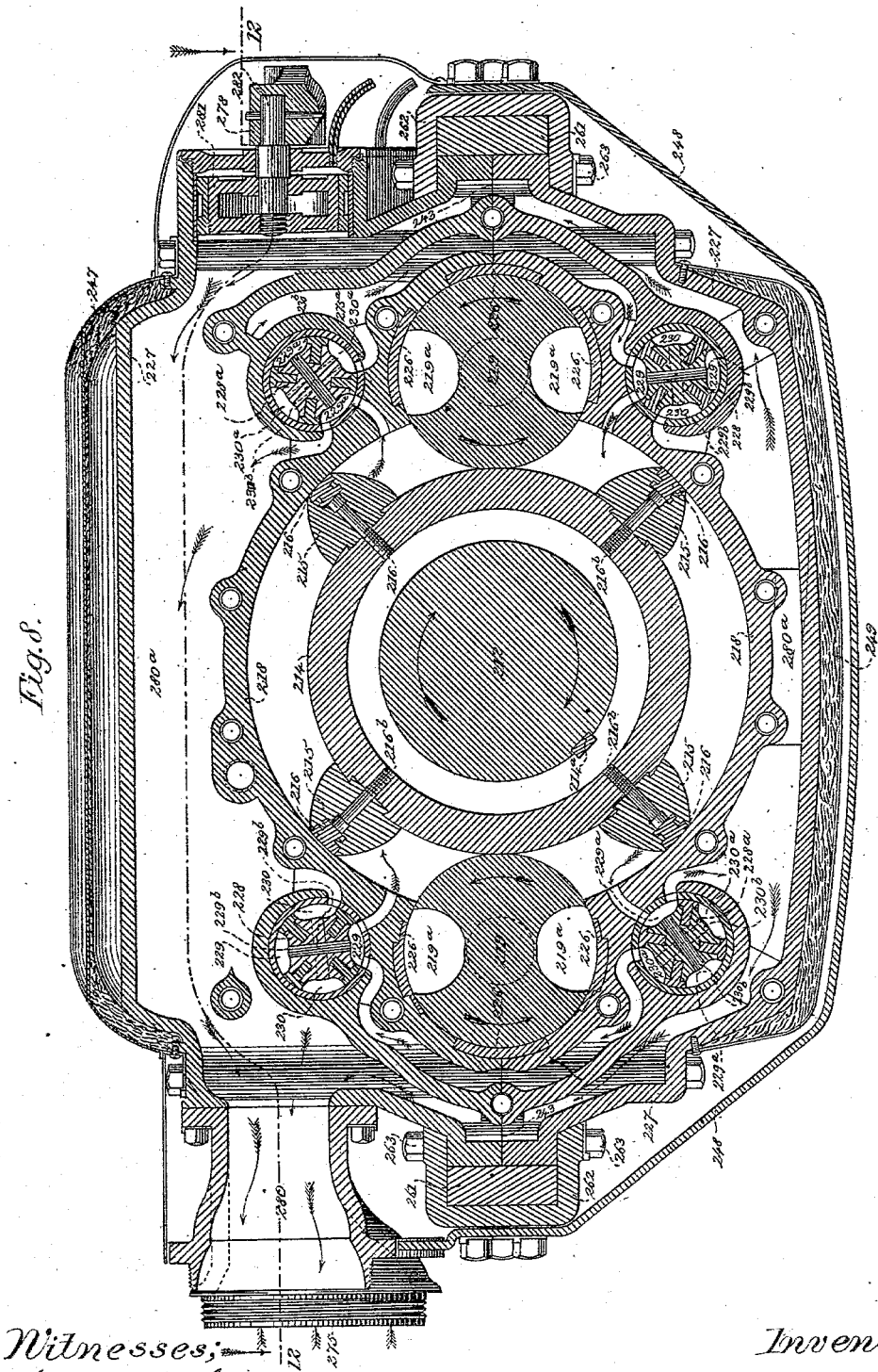
Figure 9:
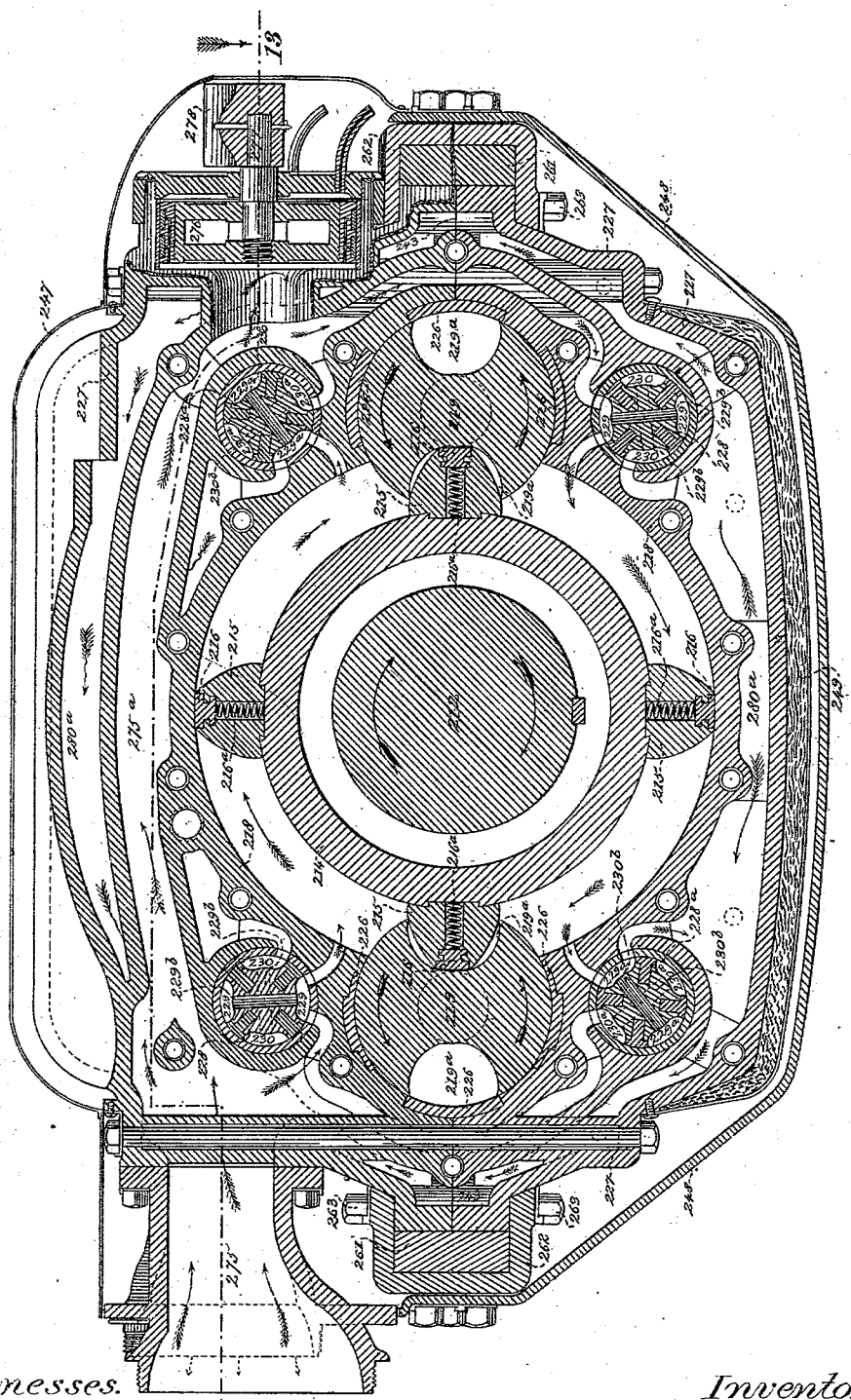
Figures 10, 11:
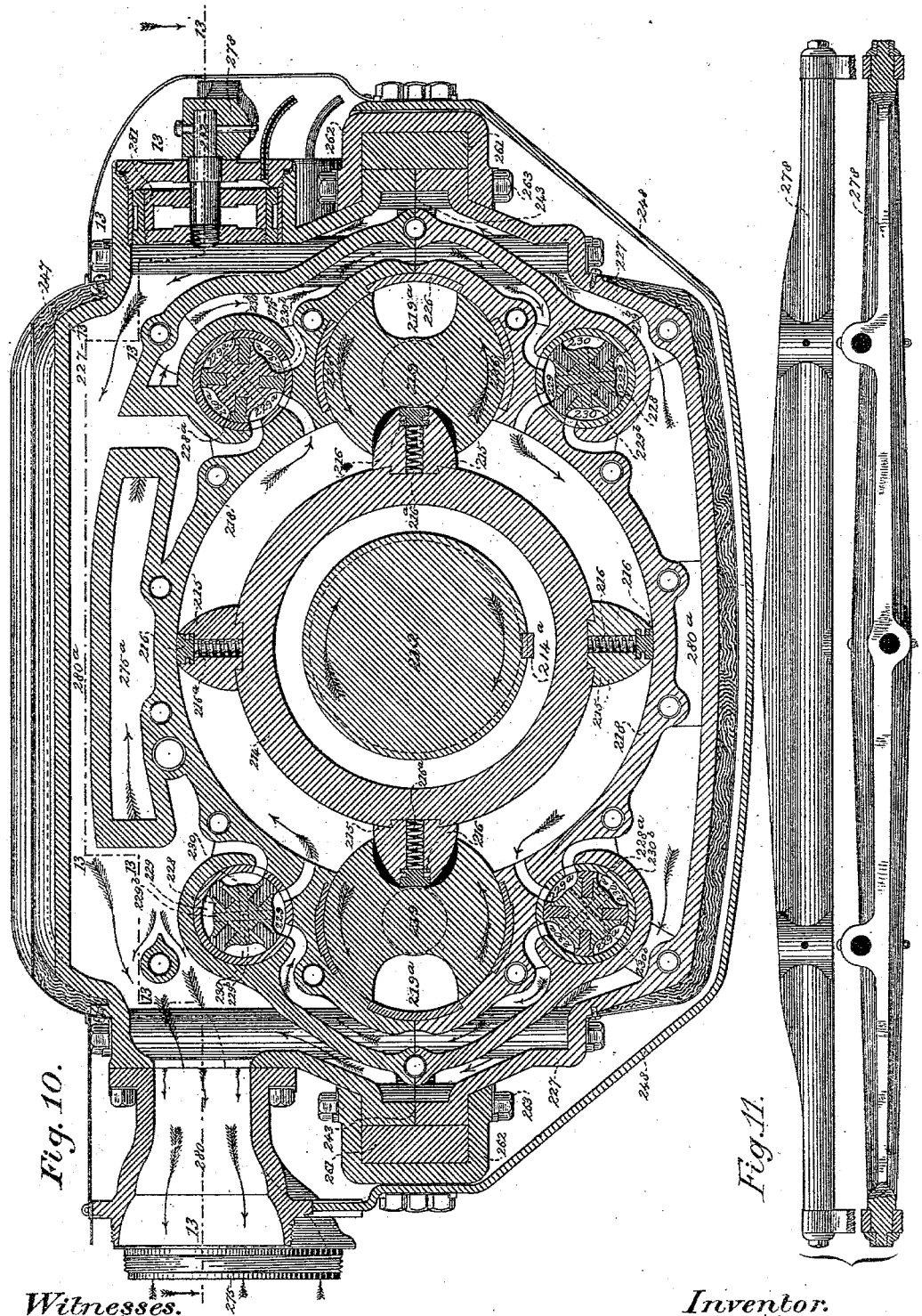
Figure 12:
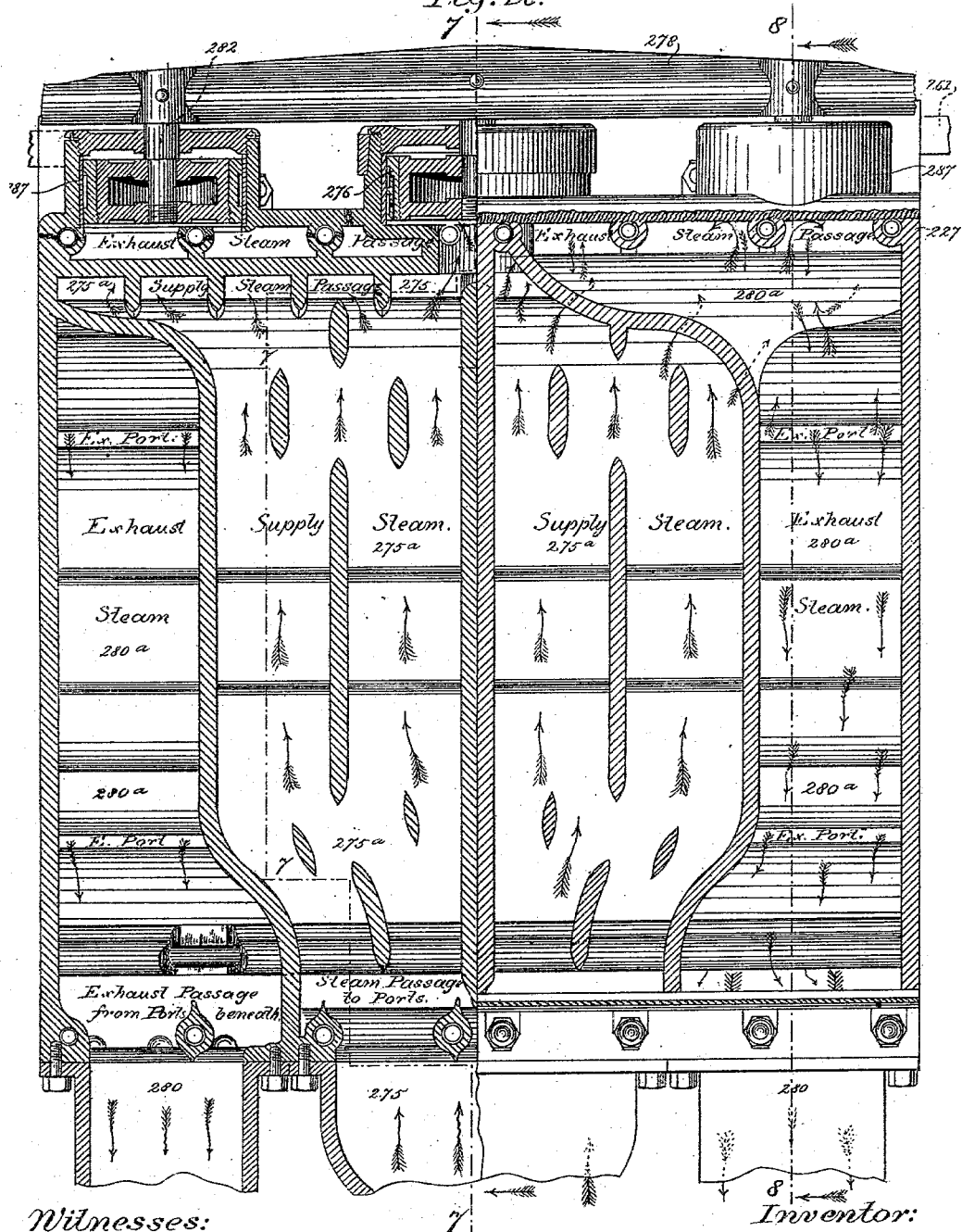
Figure 13:
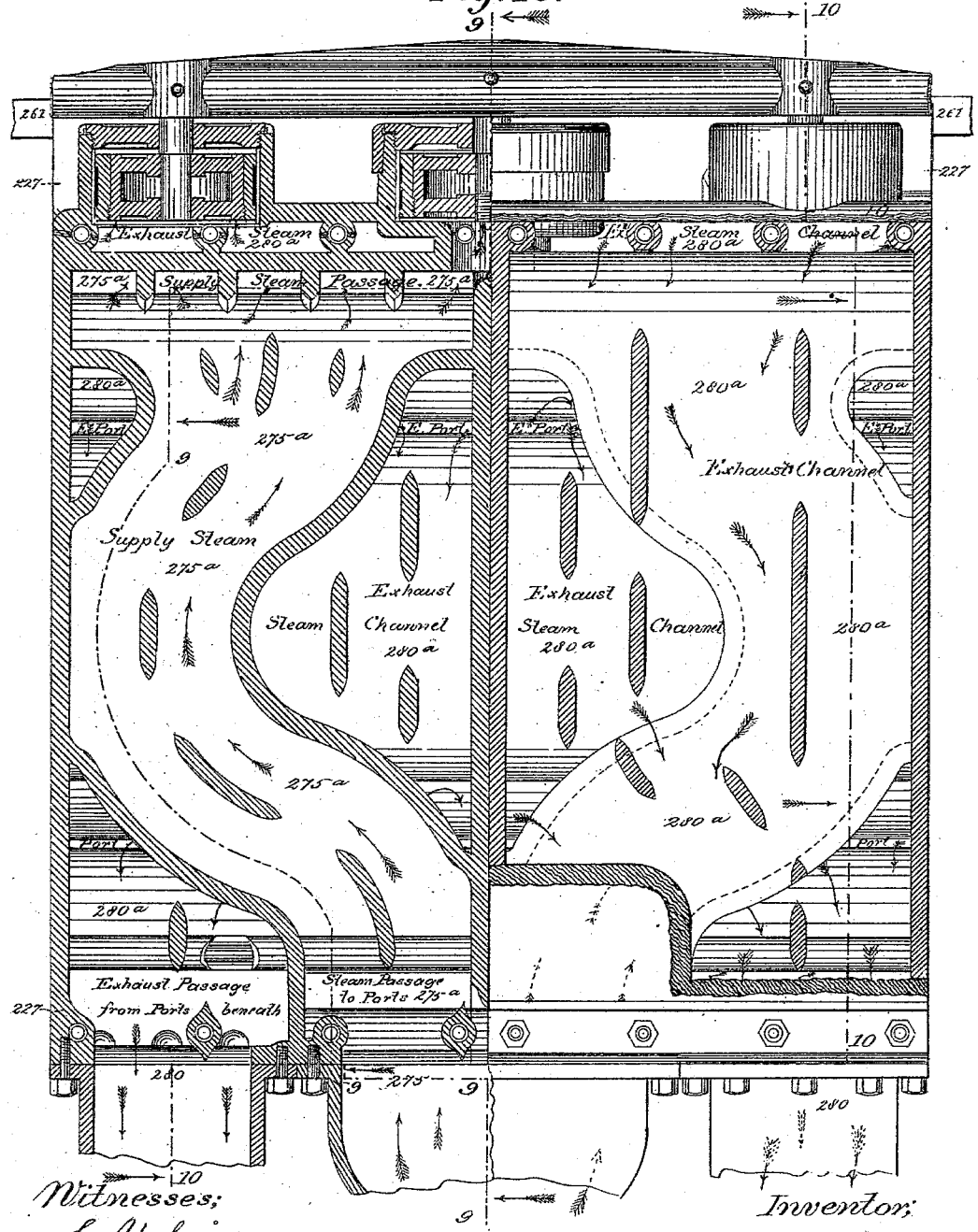
Figures 14, 15:
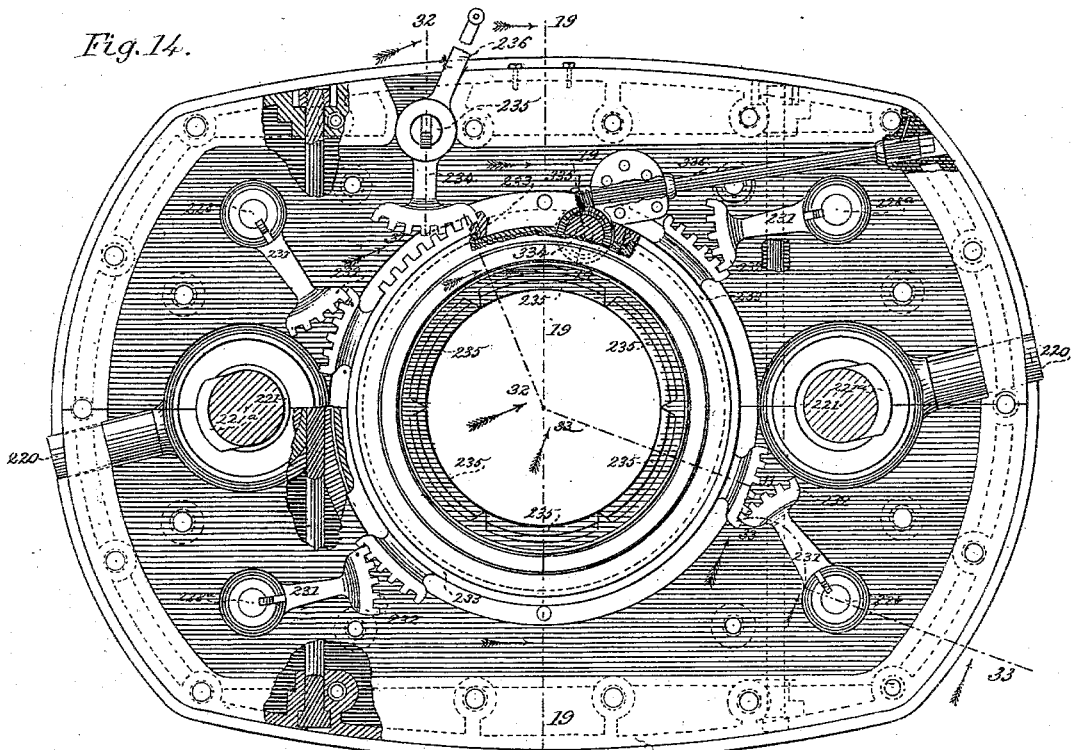
Figure 36:
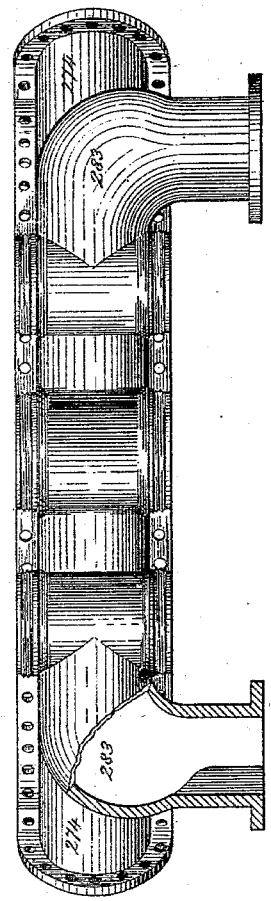
Figure 37:
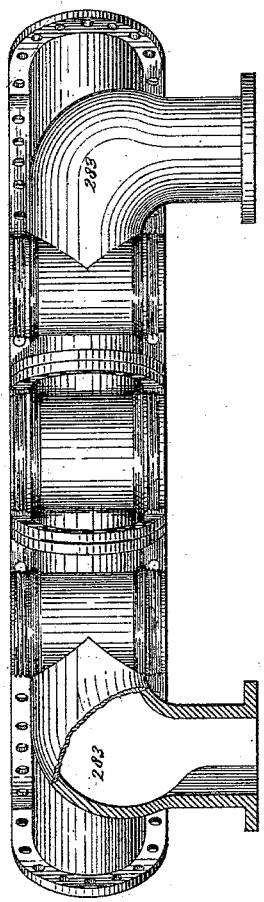
Figure 35:
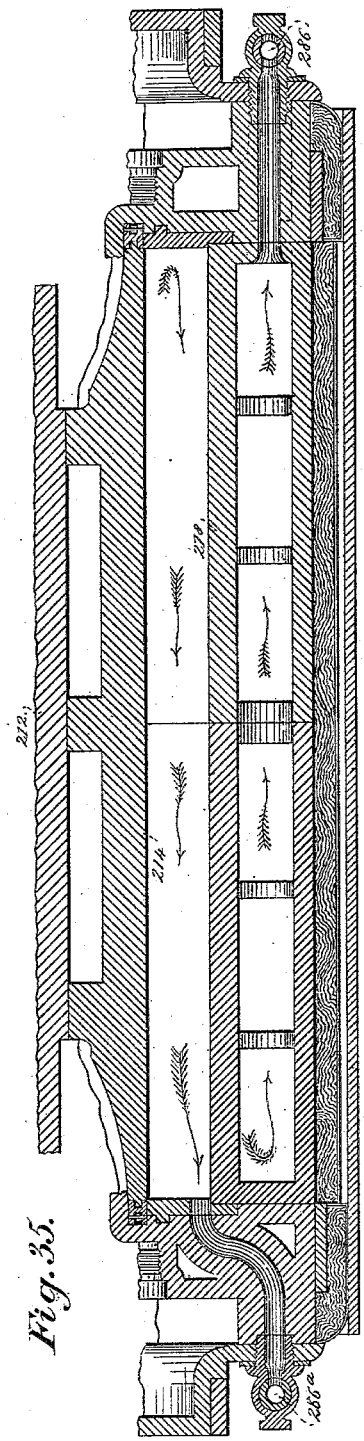
Figure 38:
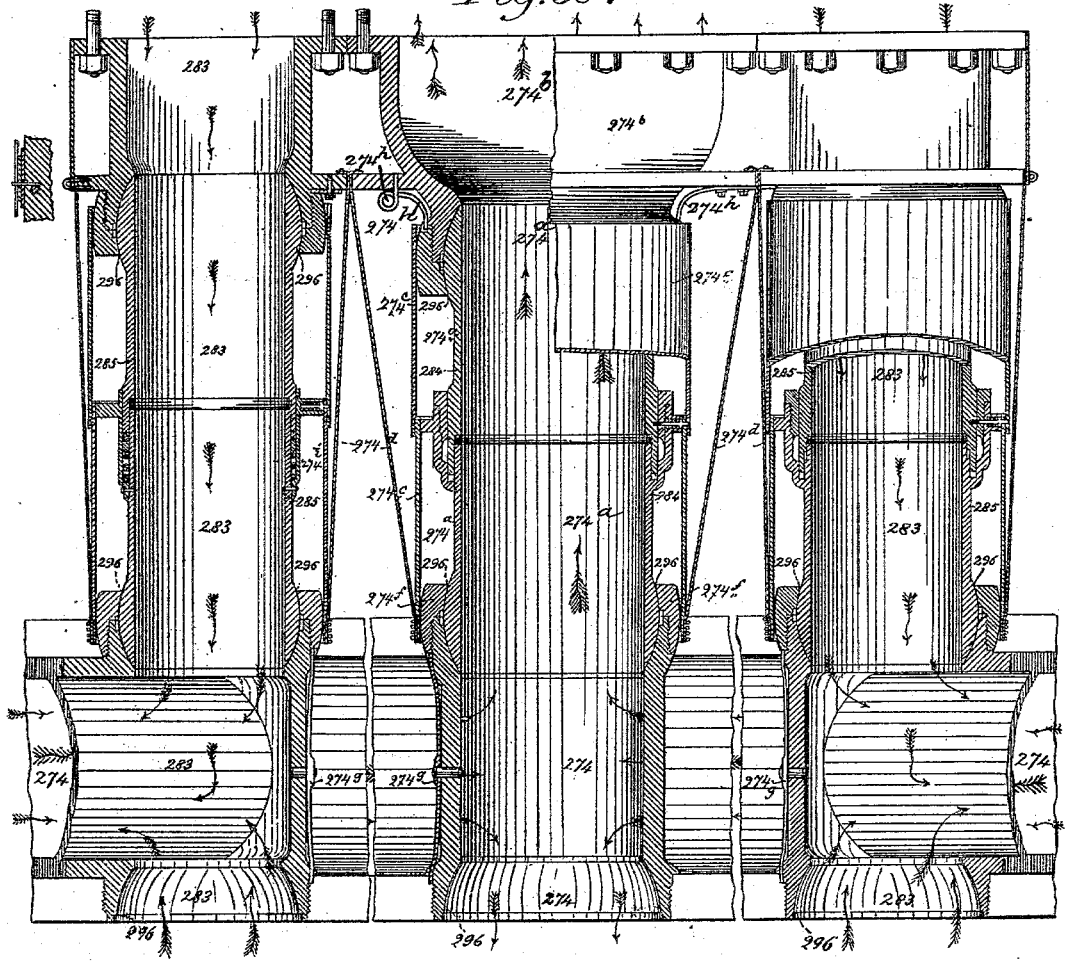

Fig. 7 is a transverse section of the engine proper in the plane of the induction-pipe, on the line 7 7, Fig. 12. Fig. 8 is a vertical section of the same in the plane of the exhaust-pipe, on the line 8 8, Fig. 12. Figs. 9 and 10 are vertical transverse sections on the lines 9 9 and 10 10, Fig. 13, in the planes of the induction and exhaust pipes, respectively, illustrating a modification in the steam-passages in the upper portion of the cylinder-casing. Fig. 11 is a view in plan and in elevation of a bar employed to sustain the pressure of equalizing or counterbalance pistons, as hereinafter described, to prevent unequal lateral pressure within the cylinder-casing. Fig. 12 is a horizontal section through the supply and exhaust steam-passages on the line 12 12, Figs. 7 and 8. Fig. 13 is a horizontal section through the supply and exhaust steam-passages on the line 13 13, Figs. 9 and 10, illustrating the modification before referred to. Fig. 14 is an elevation, partly in section, of a divided head bolted and banded with reversing valve-gears and adjustable gear, the cap of the latter being broken. Fig. 15 is the same as Fig. 14 with the bolts left out, with a part of the main gear shown on main shaft and abutment roller-gear on one abutment, with half of main shaft-gear in section and part of the head. Fig. 16 is an outer view of the opposite head divided vertically, showing the reverse valve-gear and adjustable worm-shaft. Fig. 17 is a section on the line 17, Fig. 15, of a device for adjusting or setting up the adjustable portion of the abutment-roller bearings. Fig. 17ª is a section of the same on the line 17ª, Fig. 15, showing the screw-cap in full. Fig. 18 is an elevation of the outside cover of one of the heads divided vertically and banded. Fig. 19 is a vertical longitudinal section on the line 19, Fig. 14, of one of the heads, showing the adjustable bearing segment of the main shaft, &c. Fig. 20 is a longitudinal section on the line 20, Fig. 15, of the shell or bearing case in which the bearing-segments are held. Fig. 21 is an end view of the assembled bearing-segments. Figs. 22 and 23 are longitudinal sections of two of the said segments under different modifications. Fig. 24 is a plan view of a worm-shaft and gear employed for adjusting the bearings, as hereinafter described. Fig. 25 is a view of a valve, partly in longitudinal section, with two of the packing-strips or working-faces thereof separated. Fig. 26 is a longitudinal section on the line 26, Fig. 28, of an oscillating valve within its chest or casing. Fig. 27 is a longitudinal section of the same on the line 27, Fig. 28. Fig. 28 is a transverse section thereof. Fig. 29 is an end view of the same, showing the steam-ports and valve-frame in dotted lines. Fig. 30 represents details of the valve and its accessories. Fig. 31 is a section of a portion of the valve-reversing-gear on the line 31 Fig. 16. Fig. 32 is a section of the opposite head of the engine, showing different forms of lever 236 on the line 32, Figs. 14 and 15, than that shown in Figs. 14, 15, and 31. Fig. 33 is a section of a portion of the head and one of the valves and reversing-gear on the line 33 of Fig. 14. Fig. 34 is a transverse section of the center bearing of the main shaft with a different number of bearing-pieces from those previously shown in Figs. 14, 15, and 16. Fig. 35 is a vertical longitudinal section of a portion of the engine, showing the cocks for discharging water of condensation. Figs. 36 and 37 are under side views of the boiler-pipe connections with boiler under different modifications. Fig. 38 is a longitudinal section of the steam supply and exhaust-pipes of the locomotive. Fig. 39 is a perspective view of a torsion-shaft for sustaining the engine and relieving the axle of its weight, showing a portion of the frame on which said torsion-shaft is mounted and the suspension arms and rods by which the engine is connected therewith, as hereinafter described. Fig. 40 is a longitudinal section of a portion of said shaft, showing ratchet-collar 271, ratchet-wheel 270, spring-connections, a portion of shaft in section, and part of shaft in full lines. Fig. 41 is a face view of a ratchet-wheel, 270, for connecting the said shaft with its torsion-spring. Fig. 42 is a horizontal plan of one end of the torsion shaft, frame, and spring, showing the bearing and a portion of the arm in section. Fig. 43 is a plan of the other end of the torsion-shaft and its accessories. Fig. 44 is a vertical transverse section on the line 44, Fig. 45, of a helical spring employed in addition to the torsion-shaft springs shown in Fig. 39. Fig. 45 is a horizontal section of the same on the line 45, Fig. 44. Fig. 46 is an elevation of a device for communicating simultaneous rotation to the water-cocks. Fig. 46ª is a vertical section of a portion of the same. Fig. 47 is a vertical section on the line 47, Fig. 46, showing also a transverse section of the equalizing-bar by which the locomotive-frame is supported from its springs. Fig. 48 is an inside view of the device shown in Fig. 46 for operating the water-cocks simultaneously.

The boiler 201 of the locomotive may be of the customary tubular type, with a steam-dome, 202, and steam-pipe extending outside, &c. The supporting-frame is shown at 203 204, consisting of an upper and lower bar or member on each side of the engine, connected by legs 205, which, as illustrated in Fig. 2ª, may be in one piece with the parallel bars 203 and 204 of the frame where but two pairs of driving-wheels are used in connection, clamp-bars 206 being applied beneath the pedestals and bearings secured by bolts to the brace-bar 204. Where more than two pairs of driving-axles are used in connection the frame may be made as illustrated in Fig. 2ᵇ, if desired, as it is an easier method of construction, with the brace-bar 204ª in separate pieces, to be bolted together with the clamp-bars 206 to horizontal feet at the lower ends of the legs 205. The separation of the brace-bars 204ª is for facility of manufacturing. An equalizing-bar, 207, is secured to the upper or main horizontal bar 203, between the two parallel bars of the frame, and connected at its ends by hangers 208 to springs 209, which may be of customary construction, and unite with the springs, the same as usual. The hanger may pass through the upper portion of the main frame, mortised to suit and welled out, or the hangers may pass around inside or both sides, if necessary, and connect with the equalizing-bar. The springs rest in standards 210 on the main bearings 211 of the axles 212. The driving-wheels 213 are secured to the axles 212, as usual. On the central part of each axle a piston-wheel, 214, is secured by a key, 214$^a$. The said piston-wheel carries teeth 215, provided with packing-strips 216, which are pressed outward by springs 216$^a$ in contact with the inner surface of the cylinder 218, in which the piston-wheel is fitted to revolve. On the axle are also keyed cog-wheels 217, preferably of helical form, geared with corresponding pinions 218$^a$, on abutment-rollers 219, which abutment-rollers have recesses 219$^a$ to receive the piston-teeth 215 and allow them to pass in their revolution, and by the geared connections are caused to rotate in unison with the piston-wheel without slip between their peripheries. The abutment-rollers are preferably one-half the diameter of the piston-wheel, and the gear-wheels correspondingly proportioned, so that the abutment-rollers will make two revolutions to one of the piston-wheel, adapting two recesses in the abutment-rollers to pass four teeth on the piston-wheel at each revolution of the latter. The speed of the peripheries of the piston-wheel and the abutment-rollers must be exactly the same, though in this case the periphery of the former is twice that of the latter. The abutment-rollers are pressed forward in contact with the periphery of the piston-wheel by followers 220, acting on the movable portions 221$^a$ of the bearings 221 of the abutment-rollers, which followers are provided with collars 222 to receive the pressure of springs 223 and 223$^a$, which have their rear bearing or abutment in screw-caps 224, screwed in from the outside and held from unscrewing by spring-catches 225.

Renewable surface-pieces 226 are inserted in the abutment-roller cylinder-casings. These surface-pieces may be of Babbitt or other suitable metal poured in, or of steel or other metal dressed to suit and pressed in endwise.

The top of the engine-cylinder casing 227 is concaved parallel with the convex under surface of the cylindrical boiler 201, as illustrated in Fig. 6, in order to bring the center of gravity as near the track as possible. To give sufficient length to the journal-bearings of the abutment-rollers—depth of pinion—consistent with the space allowed, the pinions of the abutment-rollers are made concave or cup-shaped on their inner faces. This form allows the main gear-wheels to be placed closer together, and thus affords, in connection with the concavity of the inner surface of the driving-wheels, additional room for the external or main bearing of the axle of the locomotive.

The engine is provided with fourfold paired reversible valves, 228 228 228$^a$ 228$^a$, each having four steam-cavities, 229 230 229$^a$ 230$^a$, and arranged in close proximity to the abutment-rollers 219 on each side thereof, and in diametrically-opposite pairs connected by radial openings 229$^b$ 230$^b$, Figs. 25 to 29, for the purpose of balancing the pressure on opposite sides of the valve. The valves are oscillated or rotated one-eighth of a revolution for the purpose of reversing the engine.

The live-steam passages are shown at 275$^a$, the exhaust-passages at 280$^a$.

Fig. 7 is a transverse section in the plane of the inlet and upper live-steam passages at 7 7, Fig. 12, and Fig. 8 a similar section in the plane of the upper exhaust-passages, 8 8, Fig. 12, representing the preferred arrangement of said passages. Figs. 9 and 10 are corresponding sections on the lines 9 and 10, respectively, Fig. 13, illustrating a modification. Fig. 12 is a longitudinal section (at 12 12) of the form of cylinder-casing shown in Figs. 7 and 8. Fig. 13 is a section at 13 13 of the form of cylinder-casing shown in Figs. 9 and 10. The construction represented in Figs. 7, 8, and 12 is preferred on account of being more easy to cast, whereas the construction shown in Figs. 9, 10, and 13, while more difficult to cast, possesses the advantage of avoiding loss by radiation by having the live-steam passages covered to a greater extent by the exhaust-passages. In the position shown in Figs. 7, 8, 9, and 10, the opposite valves 228, through their cavities 229, afford communication from the live-steam openings 275$^a$ to the interior of the cylinder, while the valves 228$^a$, through their cavities 229$^a$, open communication from the interior of the cylinder to the exhaust-passages 280$^a$, whereas one-eighth of a revolution imparted to all the valves simultaneously will reverse them, so that the pair of valves 228 become the exhaust-valves and 228$^a$ the induction-valves, thus reversing the engine. The oscillating movement or partial rotation is imparted to all the valves simultaneously by gearing, such as illustrated in Figs. 14, 15, and 16, in which 231 are arms projecting inward from the valves, carrying cogged segments 232, gearing with a cogged ring, 233, concentric with the piston-wheel and moved by a cogged segment and arm 234, keyed on a shaft, 235, extending longitudinally from end to end of the engine, and connecting similar valve-gear on the two ends of the cylinder. A shifting bar or lever, 236, being an extension of the lever 234, which passes through recess in the head beneath the outer cover, forming a close joint, in which it plays, the upper end being connected and operated by a rod, 297, as hereinafter described. A different form of lever for the same purpose is shown upon the opposite head in Fig. 16. The lever is fixed to the shaft 235, and operated by a connecting-rod, 297, from the cab of the engine, as hereinafter described.

The upper surface of the engine is provided with a protecting-casing, 247, containing a non-conductor of heat. A protecting-casing, 248, is applied to the under surface, forming a fender, and had better contain an elastic substance for the better protection of the engine, and likewise containing an internal chamber, 249, for the reception of a body of any suitable non-conducting material—as, for example, asbestus, plaster-of-paris, or the like.

In order to hold and brace the engine-cylinder against turning by the power applied to turn the axle, and at the same time relieve the axle of the weight thereof, it is supported from the locomotive-frame by elastic connections, which will now be described.

Parallel horizontal suspension-shafts 261 are secured to the sides of the cylinder-casing by clasps 262, which extend over the flanges or projections of the longitudinal joints 243, the whole being firmly secured together by through bolts and nuts 263. To the ends of the horizontal suspension-bars 261 are pivoted hangers 264, jointed at the upper ends to the extremities of crank-arms 265, projecting horizontally from a torsion-shaft, 266, which is adapted to turn in bearings 267, securely bolted to the frame 203, as shown in Figs. 4, 41. Spiral springs (which may be of any preferred form) are shown at 268 and 269, each secured at one end to the shaft bearings or brackets 267 and at the other end to ratchet-wheels 270, the teeth of which ratchet-wheels engage with corresponding ratchet-teeth on collars 271 on the shaft 266, so as to secure and hold the same. In the periphery of the ratchet-wheels 270 are holes 272, to receive a spanner, by which the said ratchet-wheels may be turned, as required, to set the springs 268 269 to any necessary tension. In practice, the weight of the engine being known, a spanner is used with an arm bearing a certain ratio in length to the crank-arms 265, when, by applying a definite draft or force to the end of said spanner, determined by a common spring-balance or dynamometer, the springs are readily set to a tension exactly corresponding to the weight of the engine. Supplementary springs may be applied to the shaft, as shown at 273, Figs. 4 and 49 and 50; or either form of spring or other suitable form of spring or elastic substance may be used alone, as preferred.

The steam-supply pipes are shown at 274 connecting with the dry-pipe or steam-dome 202 of the boiler. The said steam-supply pipes 274 extend to the outside and down on either side of the boiler and pass along the center to as many of the rotary engines as may be employed beneath the boiler on the axles of the locomotive—one or more. In practice I employ two (2) engines, one on each axle, and couple together the wheels of these axles and of two other axles, one in front and one behind those to which the engines are applied. More or less of the wheels may manifestly be coupled to serve as drivers, if desired. The steam enters the engine-casing through a passage, 275, at the top of one side of the cylinder-casing, the natural effect of which would be to apply an unbalanced internal pressure at the opposite side of the engine-casing equal to the pressure of steam on an area equivalent to that of the steam-passage 275. To eliminate this unbalanced pressure, which would tend to tip or turn the cylinder on the shaft, I employ a counterbalancing-piston, 276, Fig. 9, connected by a piston-rod, 277, to a horizontal bar, 278, attached at each end to a tie-rod, 279, on either side of the locomotive, which tie-rods from the two engines are united together and to the frame of the locomotive by a transverse bolt, 279ª, permitting the angular movement demanded by the vertical motion of the locomotive-frame relatively to the running-gear. The exhaust is delivered through openings 280 on about the same level as the induction-passage 275, and the said pressure, which would be represented by the area of the exhaust-openings 280, is counterbalanced by pistons 281, similar to the pistons 276 described for counterbalancing the pressure with relation to the steam-passages, and connected by rods 282 with the same horizontal bar 278. The pressure against the pistons 276 and 281 is thus sustained completely outside of the engine-cylinders and without any tipping effect thereon.

In order to permit the necessary relative movement between the boiler and engines, the steam and exhaust pipes are furnished with the coupling-joints illustrated in Fig. 38, in which 274 represents one of the steam-pipes before described, and 283 exhaust-pipes leading from the engine-cylinder and conducting the discharged steam to exhaust-nozzles in the stack of the locomotive, or to any preferred place of delivery. 284 285 represent pipe-sections introduced in the steam and exhaust pipes, respectively, and connected therewith by ball-and-socket joints 296, to permit the relative movement, already referred to, between the two parts of the respective pipes.

Cocks for the discharge of water of condensation are shown at 286 in Fig. 2 and at 286 286ª on each side of Fig. 35. These are operated by shafts 287, furnished with sliding couplings 288, to permit the relative vertical movement already referred to between the locomotive-frame and the running-gear, and having on their upper ends beveled pinions 289, gearing with a beveled wheel, 290, one of which wheels 290 is keyed on each end of a horizontal shaft, 291, extending from side to side of the engine, and having a crank-arm, 292, connected by rod 293, lever 294, and rod 295, with the cab of the locomotive, so that all of said cocks 286 286ª on both sides of the engine may be opened or closed simultaneously by the engineer. The cocks 286 on one side of the locomotive communicate with the exhaust-passages of the cylinder, while those 286ª on the other side communicate with the live-steam passages. The exhaust-water cocks 286 have through-ports, as shown in Fig. 35, so as to be opened by one-half a revolution in either direction, whereas the live steam water cocks 286ª have ports only on one side. Fig. 35 shows the discharge-cocks 286 and 286ª both open. It will now appear that one-quarter of a revolution applied simultaneously to the two cocks will close them both, or that a half-revolution from the position shown in Fig. 35 will open the cock 286 and close the cock 286ª. This provision for opening the water-discharge connected with the exhaust-passages while those connected with the live-steam passages are kept closed is for the purpose of discovering a possible leakage of steam in the engine, which would result in the direct and continuous passage or escape of live steam through the exhaust-passages and cock 286. This would at once be detected by the engineer, and would enable him to obviate the difficulty by tightening up the abutment-rollers.

For stopping, starting, or reversing the motion of the locomotive, the required movement is communicated to the valves of the engines simultaneously by means of a rod, 297, extending from the cab of the engine to arm or lever 236, Figs. 14, 15, and 32, which is an extension of the arms 234 past the fulcrum or shaft 235, thence through the recess in the projection of the head under the cover out to receive the rod 297, whereas the lever 236ª is a separate lever and connects to the reversing-shaft 235 outside of the outer cover through which the shaft passes. (See Fig. 31.) In order to carry the valve-operating connections past the steam-pipe projections at the central part of the boiler, supplemental levers 299 are employed, projecting downward and connected at their lower ends by a rod, 300. By coupling together two shafts, with a single rotary engine mounted on each, with the piston-teeth of the respective wheels alternated in position, so that the teeth in one cylinder will be under the full head of steam-pressure while those in the other cylinder are passing their ports, the effect is produced of a double engine without the necessity of constructing the double engine for that purpose, effectually avoiding dead-centers. The crank-pins on the respective wheels of each axle are set ninety degrees apart for the same purpose.

The mode of coupling together the wheels on one side of the locomotive is illustrated in Figs. 1, 4, 5, 6, 39, and 40, the last two figures showing the coupling devices in detail on a larger scale. Hollow wrist-pins are employed having shoulders 302, fitting in a rabbet or recess in the outer face of the wheel. The open inner end of the hollow wrist-pin receives a screw-plug, 303, the head or flange of which rests on a shoulder, 304, on the inner face of the wheel, so as when turned in to draw the wrist up firmly to its seat. A longitudinal key, 305, holds the wrist-pin against rotation, and a spring catch or bolt, 306, in the head or flange of the screw-plug 303, engaging with a notch or aperture prepared for it in the inner periphery of the plug-seat in the driving-wheel, secures the said plug against loosening. The axial opening in the wrist-pin 301 communicates through a radial hole, 307, with or without a circumferential groove, 308, in the periphery of the wrist, and with an oil-cup, 309, mounted in the upper clamp-plate, 310, by which the coupling-rods 311 312 are connected together on the box of the wrist-pin. The two clamp-plates 310 310ª are formed on their inner faces with tongues or projections 313 314, fitting in corresponding grooves in the upper and lower faces of the coupling-bars 311 312, the tongues or projections 313, which are nearest to the extremities of the coupling-rods 311 312, being of greater depth than the tongues 314, so that the grooves to receive the latter may not cut away so much of the metal. The clamp-plates 310 310ª are securely fastened by through-bolts passing through the tongues 313 314, respectively. The bolts 315, near the extremities of the coupling-rods, are of larger diameter than the bolts 316, which are more remote from the extremities of said coupling-rods. By thus employing tongues and grooves of greater depth and clamp-bolts of larger diameter near the extremities of the rods, I avoid unnecessary cutting away of metal and consequent weakening of the rods at points more remote from their extremities. The coupling-rods are made elliptical in cross-section, with their major diameter vertical, as plainly shown in Figs. 39 and 40; or they may be of any desired shape. They are brought out to rectangular form at their ends, where they are held by the clamp-plates 310 310ª and bolts 315 316, affording sufficient increase in metal to compensate for the metal bored out for the bolts 316, so that these bolts leave the rod of its full strength between the clamp-plates. It will further be seen that where the larger openings are bored in the clamp-plates 310 310ª to receive the bolts 315 the loss of metal is compensated by the extra depth of the tongues 313, so that the strength of the clamp-plates is not impaired. The endwise strain is taken by the tongues 313 314, the bolts 315 316 serving to keep the clamp-plates firmly in their seats, while the tongues 313 314 relieve the bolts of any transverse strain.

The box 317 of the wrist-pin is made in two parts, and is set up to the flange, journal, or wrist-pin by the action of keys 318 bearing against steel-plates 319, and provided with screw-shanks 320, extending upward through a yoke, 321, above and below which are lock-nuts 322 323 on the screw-shanks 320 for tightening and securing the keys. The shanks 320 of the keys are preferably placed above the clamps and boxes, as herein shown, as the downward projection of said shanks and of the yoke 321 underneath coupling-rods would be impracticable or undesirable with the small driving-wheels employed in my improved locomotive. A fender for the protection of the heads of the keys may be applied, if desirable, below the lower clamp-plate, 310ª, secured by bolt-heads or nuts, and having mortises, through which the keys 318 may pass.

The driving-wheels are dish-shaped, as shown in Figs. 5, 6, and 40, in order to afford the greatest possible room for the rotary engine lengthwise of the axle, and to afford the greatest possible area for pressure on the piston-teeth, and the requisite length of locomotive-bearings. Key-boxes receive the keys 217$^a$ for securing the gear-wheels 217 on the axles. Rings 324 are recessed in their inner faces at 217$^b$ to accommodate projecting heads of the keys. This ring fits tight on the main shaft and against the gear-wheel hub, forming an oil-tight joint therewith. Upon the outer surface is a spring packing-ring similar to that on the head, for the rim of the piston-rim to work against. This packing fits the surfaces of the outer cover of the head and forms oil-tight joints at each end of the engine. The ring and a portion of the outer cover are shown in detail on a larger scale in Fig. 5$^a$.

The axle-bearings within the cylinder-heads are constructed, as shown in Figs. 5 and 6 and 19 to 23 inclusive, with segments 325, having wedge-shaped or inclined projections 326 on their backs, engaging in radial openings 327 in a casing 328, Figs. 19 and 20, within which the said bearing-segments 325 are held and guided. A wedge-shaped ring or cylinder, 329, surrounds the casing 328, having converging faces which bear on the wedge-shaped projections 326, so that a longitudinal movement of said ring 329 will force all the bearing-segments 325 radially inward. To impart this longitudinal movement of the ring, 329, it has an internal screw-thread, as shown in Fig. 19, engaging with an external screw-thread, 330, Fig. 20, on the casing 328, and said ring is furthermore provided with a cogged rim, 331, which has a pinion, 332, said pinion being keyed or otherwise secured to a short shaft, 333, the inner journal of which rests in a bearing in the ring 330$^b$, (see Figs. 19 and 20,) which shaft is provided with a worm-pinion, 334, which derives rotation from an endless screw, 335, on the shaft 336, Fig. 24, extending to the exterior of the casing, so that by means of a suitable key or wrench the entire series of bearing-segments 325 may be set up to the journal from the outside. The bearings are thus adjusted as they wear, and when necessary are readily renewed by rebabbitting them on their faces, if babbitted segments are used, or made solid of the best box-metal, and replaced by new pieces when worn too much. All should be renewed or replaced at the same time, in order to maintain an exact and continuous central position of the piston-wheel to the cylinder.

The main shaft or axle is preferably made hollow to a limited extent to add efficiency thereto, and, if desired, the hole therein may be supplied with oil and have fine radial holes to lubricate the engine-bearings. If oil or other lubricant is used, the ends of the opening should be plugged and a radial hole provided at each end extending through the hubs of the wheel or diagonally outside, with small removable lock-screw plugs, both on the same side of the wheel, the one to receive the oil and the other at the opposite end to discharge the oil and when the wheels are the opposite side up the plugs may be removed and the axle cleaned by force-pump, if desired, and reoiled, ready for use.

The piston-wheels are convex at each end, as represented in Figs. 5 and 6, in which the main shaft bearings of the engine are inserted in their respective heads, the object of which is to extend the length of the piston-teeth as much as possible with the least length of engine, and thus allow for the greatest piston area with the least diameter of piston-wheel, and so bring the center of gravity of the locomotive as low as possible, and give just sufficient space to clear the engine from obstructions on the track. The heads contain all the bearings of the engine, and being cast hollow for reservoirs for oil or other lubricant, which can be continually supplied, insures constantly-lubricated bearings. The inner projections of the heads, which sustain the ends of the main bearings, fit the main shaft and the recess in the end of the piston-wheel. The rim of the piston-wheel fits a recess in the head, which may extend a short distance in, or may come flush therewith, in which is fitted a spring packing-ring, forming a steam-tight joint against the rim of the wheel. This ring is allowed a play beneath, which prevents the possibility of end-binding of the piston-wheel. Renewable end surface-pieces for the piston-teeth to work against are inserted in recesses in the heads, in which they fit, with tongues or grooves in both to fit each other. (See Figs. 5 and 6 for the illustration of this.) These surface-pieces are doweled to the head to prevent them from turning. The heads are also doweled to the respective cylinder or casing to assist in securing correct position. This engine, being divided through the center to enable it to put on and off the axle when the wheels are on it, therefore differs in that as well as in other respects from those described and claimed by me in other applications of even date herewith. The head-covers and the bearing-casings are divided, as shown in Figs. 5, 6, 14, 15, 16, and 17. The parts of these heads are all bound together with heavy bands 344, as are also the outer covers by their heads 334. They may all be divided either longitudinally or vertically and bolted, if desired. The heads are also banded inside and bearing-casing outside, 330$^a$ being the outer band, which screws on the flange of the bear-casing 228 and sustains its outer surface. This band also forms a bearing for the reversing-ring 233 and holds it in position. A pin hollow at one end, with a screw-thread therein to enable it to be withdrawn, is inserted through the casing-flange and into the ring to prevent it from unscrewing. (See Fig. 6.) The inner projections of the heads are held together by a ring, 330$^c$, which screws upon the projection or flange thereof and holds it firmly. The rim is held from unscrewing by a hollow plug threaded inside to enable it to be removed when required. (See Fig. 6.) This plug is upon the upper side of the flange, and prevents the ring from unscrewing. The heads having been put in position upon the shaft, with the engine thereon, when the bearing-casing with all the bearing, adjusting-band, and reversing gear complete thereon, is fixed in the head in which it fits—the outer portion being firmly screwed in the head—it is held from unscrewing by a similar plug threaded inside to the casing and passing through the outer surface of the casing in the ring 330$^a$ just beneath the hub of the main gear. (See Fig. 6.)

The main pipe extends from the dome within the boiler opposite the space between the engines, if two are employed, or to the same relative position for either, as may be required, out of the boiler, around the bottom of the same, in one or more pieces, as may be required, and then unites with one or more branch pipes, (according to the number of engines employed, as may be required,) for conducting steam to the engine or engines. These live-steam pipes are provided with two short pipes each, 274$^a$. (See Fig. 38.) They are connected with the main pipe 274 and with the engine-connection 294$^b$ by ball-and-socket joints. (See Fig. 38.) The ends connecting in the center are united with stuffing-box upon one, the rim of the other fitting therein in the deep recess extending beneath the box, to permit of end plug and not permit the packing to get beneath, where packing is inserted in the box and the gland screwed up, which permits of end motion as well as vertical and lateral motions without leakage. The short pipes and gland, also the two short pipes 274$^c$ outside, which form protection of steam from radiation of heat, are all screwed in their relative position to each by the lock spring-bolt, (see Fig. 38,) which passes through them. The collar of the bolt fits the hole in the flange upon the outer port of the stuffing-box, the inner end being turned smaller, upon which a coiled spring fits, which sits in the hole and permits end-play to the bolt, the hole being of sufficient depth. The gland being screwed in, the spring and bolt are inserted, when the pipes, which are telescoped, are pulled out and screwed together, threads being upon the outside of one and the inside of the other for that purpose, and a hole provided to fit the outer end of the spring-plug which passes therein up against its shoulder and secures all in their relative positions; and as a further protection a canvas covering, 274$^d$, is provided for the better protection of heat.

The socket-joints are made of two pieces, the end of the main pipe 274 or the end of engine-connection 274$^b$, as the case may be, with a nut, 274$^f$, fitted to each, and bored out the proper size and shape to fit the ball-joint 296 upon the respective end of the two pipes, water-grooves being turned in each surface of the joint to assist in holding condensed water for lubricant and securing tight joints. These pipes 274$^a$ had better be of good brass or other suitable material to prevent rusting of joints which have but little play. A recess may be cut in the center where the nut joins upon the flange-connection, to take off necessary friction. These nuts are held from unscrewing by spring-catches 274$^g$ and 274$^h$ at the respective ends, all of which are shown in Fig. 38.

The exhaust-steam pipes, extending from the engine back to the outer surface of the main pipe 274, are similarly constructed in all particulars to the main steam-pipes 274$^a$ and 274$^c$, just described, except there being no gland in the center connections of one, there being an outside piece, 274$^i$, which extends farther along the pipe, and is screwed and held firmly thereto, forming a deeper recess than the other method. In the recess is a coiled spring, over which a ring fits, with packing above the ring, which the end of the pipe rests against and allows of end-play. This may be sufficient joint for the exhaust-pipe, and be a little cheaper in construction. It shows modification of construction of the stuffing-box only. (See Fig. 38.)

The connection-pieces 274$^b$ to the ends of the engines are covered with metallic or canvas casings, which are secured to the engine under the turned-up edges of the outer non-conductor covering, (shown in Figs. 7 to 10, inclusive,) and to the steam-connections 274$^b$, by staples in the flanges, in which they are fitted, (shown in Fig. 4 and in detail in Fig. 38,) which staples pass through slots in the covering, and then, passing through the staples, holds the casing in position, thus protecting steam from loss of heat. The exhaust-pipe returns from the engine to the outer surface of the main pipe 274, thence along its surface a short distance, and branches off each side of the boiler, to which it is riveted or secured, as shown in Figs. 1, 2, 2$^a$, 3, 36, and 37, to the nozzle in the smoke-stack, &c., to prevent loss of heat from the boiler by the exhaust-steam, a thin sheet, beneath the exhaust-pipes, respectively, between their flanges, which are secured to the boiler, is placed, which sets a little out from the boiler in the pipe, and may have, if desired, a little non-conductor of heat between them and the boiler, to prevent loss of heat from the boiler by the exhaust-steam. (Shown in the broken ends of exhaust-pipes in Figs. 1, 2, and 2$^a$.)

A single engine may be used on one axle of the locomotive for light draft, or a double engine, with teeth alternately arranged, may be used, the teeth being two to each piston-wheel where a cut-off is employed, so as to work the steam expansively, or four on each wheel where a cut-off is not employed; or single cut-off engines may be used on two or more shafts coupled together. The details of my cut-off engines I have described in other applications of even date herewith.

Having thus described my invention, what I claim as new, and desire to secure by Letters Patent, is—

1. In combination with the frame, axle, and driving-wheels of a locomotive, a toothed piston-wheel keyed or fixed on said axle, a cylinder or casing attached to said frame by elastic connections, two abutment-rollers running in bearings in said casing, geared to the piston-wheel, so as to rotate in unison therewith, and recessed for the passage of the teeth thereof, and suitable reversing-valves, substantially as and for the purposes set forth.

2. In combination with the frame, axle, and driving-wheels of a locomotive, a toothed piston-wheel keyed or fixed on said axle, and a bisected or divided casing inclosing the same, bisected heads, and recessed abutment-rollers operating in unison therewith, substantially as and for the purposes herein set forth.

3. In a locomotive having a rotary engine with counterbalancing-pistons, arranged to counteract the pressure of the steam from the inlet and exhaust pipes on the opposite sides thereof, corresponding in areas to the areas of the respective pipes, substantially as and for the purpose set forth.

4. In a locomotive having a rotary engine with counterbalancing-pistons, arranged as described, in combination with the piston-rods 282 and 277, and bar 278, and keyed pin and rods 279, and pivot or hinged bolts, substantially as and for the purpose set forth.

5. In a locomotive having a rotary engine with bisected bearing-housing, secured as described, in combination with the adjustable segmental main-shaft bearing 325, toothed ring 331, and pinion 332, and operated by means of a worm and gear, substantially as and for the purposes set forth.

6. The combination, with the driving-axle, toothed piston-wheels, recessed abutment-rollers and casing, and with the body of a locomotive, of the reversing-valves 228 228ª, segment-arms 231 232, toothed ring 233, concentric with the axle and having toothed arms, with which the toothed valve-levers mesh, segment-arm 234, rock-shaft 235, levers 236, and suitable connections to enable the simultaneous operation of the valves from the cab of the locomotive, substantially as set forth.

7. The combination, in a locomotive, of two or more axles and their driving-wheels, connected by suitable coupling bars or rods, and toothed piston-wheels fixed on the respective axles, recessed abutment-rollers geared to said piston-wheels, casings, within which said toothed piston-wheels and recessed abutment-rollers rotate in unison, and suitable reversing-valves, the teeth of one of said piston-wheels being arranged to pass the abutment-rollers and steam-inlet ports while those of another or other of the piston-wheels are under full steam-pressure, substantially as and for the purposes set forth.

8. In combination with the boiler and one of the axles of a locomotive, a piston-wheel keyed or fixed on the axle, and a casing therefor, connected to the frame and having a concave upper surface parallel, or nearly so, with the under surface of the boiler, so as to reduce the vertical space occupied by the rotary engine and bring the boiler or body of the locomotive nearer the track, substantially as set forth.

9. In combination with a rotary engine mounted on the axle and secured to the frame of a locomotive, the fender 248, incasing the bottom of the engine-cylinder and secured thereto at front and back, substantially as and for the purposes set forth.

10. In a locomotive, the combination of a driving-axle, a toothed piston-wheel keyed or fixed thereon, abutment-rollers geared to the piston-wheel to rotate in unison therewith and recessed for the passage of the teeth thereof, and a casing containing cylinders for the said piston-wheel and abutment-rollers connected to the running-gear frame, and having steam inlet connections 275 and exhaust connection 280 at front or back of the casing, tangentially, or nearly so, to the piston-wheel, substantially as set forth.

11. A locomotive with a rotary engine having a bisected casing, constructed as described, with projections for securing suspension-bars 261 by means of clasps 262, substantially as and for the purposes set forth.

12. In combination with a locomotive, a trochilic engine or engines having piston wheel or wheels and abutment-rollers, with adjustable bearing-pieces for their journals, with automatic followers and springs for securing the surfaces of the abutment-rollers to the piston-wheels, for the purposes set forth.

13. The bisected and banded outside end covers for the cylinder-heads, for protecting gearing therein and forming oil-chambers, in combination with a locomotive rotary engine, substantially as set forth.

14. A locomotive having a rotary engine with bisected heads, made hollow to form closed chambers for oil or other lubricant, substantially as and for the purposes set forth.

15. The combination, in a locomotive, of an axle and its driving-wheels, a toothed piston-wheel keyed or fixed on said axle, recessed abutment-rollers geared to rotate in unison with the piston-wheel, and a casing containing cylinders for the said piston-wheel and abutment-rollers supported from the locomotive-frame, so as to relieve the axle of the weight of the engine, excepting the piston-wheel, substantially as set forth.

16. The combination, in a locomotive, of an axle and its driving-wheel, a toothed piston-wheel keyed or fixed on said axle, recessed abutment-rollers geared to rotate in unison with the piston-wheel, a casing containing cylinders for the said piston-wheel and abutment-rollers, suspension-bars 261, and suitable springs, 268 269 273, forming an elastic connection for suspending the engine from the locomotive-frame independently of the axle, substantially as and for the purposes set forth.

17. The combination, with the frame and one or more axles of a locomotive and a rotary engine or engines operating directly on such axle or axles, of a torsion shaft or shafts, 266, sustaining the position of the engine upon the locomotive-frame to keep it from tipping, substantially as and for the purposes set forth.

18. The combination, with a locomotive-frame, one or more driving-axles, and a rotary engine or engines operating directly on said axle or axles, of suspension-bars 261, hangers 264, arms 265, torsion-shafts 266, attachments 267, and one or more springs, 268, 269, or 273, substantially as and for the purposes set forth.

19. The combination of the torsion-shafts 266, suitable springs, 268 269, ratchet-wheels 270, and collars 271, for regulating the strength of the springs, as and for the purposes set forth.

20. In combination with a driving-axle of a locomotive and a trochilic or rotary engine operating directly thereon, driving-wheels formed with concave inner faces and convex outer faces to afford greater length to the engine and space for the locomotive-bearings between the ends or heads of the engine-casing and the inner faces of the said driving-wheels, substantially as set forth.

21. In combination with a locomotive having a trochilic or rotary engine, a hollow wrist-pin secured to the wheel and held in position by a countersunk lock-bolt, substantially as set forth.

22. In a locomotive provided with a rotary engine, the concaved abutment-roller pinions, in combination with the main gear-wheels and main shaft of a rotary engine and driving-wheels, substantially as and for the purpose set forth.

23. The ring 324, containing a recess, 217$^b$, for the head of the key 217$^a$ of the main gear-wheel, and a recess for the packing-ring, forming an oil-tight joint for the outer cover of a rotary-engine head, in combination with the driving-axle of a locomotive, substantially as and for the purpose set forth.

24. A locomotive having a rotary engine or engines operating directly on one or more of its axles, and one or more live-steam pipes extending from the steam dome or domes partially around the exterior of the boiler between the locomotive-axles and connecting with the engine cylinder or cylinders, substantially as shown and described.

25. In a locomotive having one or more rotary engines provided with a main steam pipe or pipes which have branch connections with said engines and boiler, pipe-connections provided with ball-and-socket and telescopic joints, substantially as specified.

26. In a locomotive having one or more rotary engines, a main steam pipe or pipes having branch connections with said engines, provided with ball-and-socket and telescopic joints, and secured in position by lock-joints and casings, substantially as set forth.

27. In a locomotive having one or more rotary engines, the exhaust-pipes with branch connections from the engines, provided with ball-and-socket and telescopic joints, connecting with pipes leading to the nozzles in the smoke-arch, substantially as specified.

28. In combination with a locomotive having one or more rotary engines, of cylinder water-cocks 286 286$^a$ and suitable shafts, 287, gearing 289 290, and connections 292 293, for operating them simultaneously, substantially as set forth.

29. In combination with a locomotive having one or more rotary engines, of cylinder water-cocks, suitable shafts and gearing for operating the same, and sliding coupling or couplings to compensate for motion between the body of the locomotive and the running-gear, substantially as specified.

30. The combination, with the driving-wheels and axles of a locomotive, of rods coupling the wheels and trochilic or rotary engines mounted on the axles, with their teeth or pistons arranged alternatingly with respect to the steam-ports, so as to operate in conjunction as a double engine.

I. N. FORBES.

In presence of—
ERNEST ABSHAGEN,
FRED. L. FOSTER.